United States Patent
Hwang et al.

(10) Patent No.: US 7,336,599 B2
(45) Date of Patent: Feb. 26, 2008

(54) APPARATUS AND METHOD FOR JOINT DETECTION RECEIVING IRRESPECTIVE OF ORTHOGONAL CODE LENGTH IN MOBILE COMMUNICATION SYSTEM

(75) Inventors: Sung-Oh Hwang, Yongin-shi (KR); Ping Wang, Beijing (CN); Gang Liu, Beijing (CN); Tao Fan, Beijing (CN); Hye-Young Lee, Seoul (KR); Jin-Weon Chang, Seoul (KR); Hyeon-Woo Lee, Suwon-shi (KR); Chunhua Wang, Beijing (CN)

(73) Assignee: Samsung Electronics Co., Ltd (KR)

( * ) Notice: Subject to any disclaimer, the term of this patent is extended or adjusted under 35 U.S.C. 154(b) by 890 days.

(21) Appl. No.: 10/657,669

(22) Filed: Sep. 8, 2003

(65) Prior Publication Data

US 2004/0052236 A1 Mar. 18, 2004

(30) Foreign Application Priority Data

Sep. 7, 2002 (KR) ............ 10-2002-0054062

(51) Int. Cl.
*H04J 11/00* (2006.01)
(52) U.S. Cl. ............ 370/208; 370/335; 370/342
(58) Field of Classification Search ........ 370/208, 370/335, 210, 342; 375/147, 148, 149, 150
See application file for complete search history.

(56) References Cited

U.S. PATENT DOCUMENTS 7,003,019 B2 * 2/2006 Zeira ............ 375/147

2003/0128742 A1 * 7/2003 Johnson ............ 375/147
2004/0001528 A1 * 1/2004 Kim et al. ............ 375/130

FOREIGN PATENT DOCUMENTS

CN 1362803 8/2002

OTHER PUBLICATIONS

Marius Vollmer et al., Comparative Study of Joint-Detection Techniques for TD-CDMA Based Mobile Radio Systems, IEEE Journal on Selected Areas in Communications, vol. 19, No. 8, Aug. 2001.

* cited by examiner

*Primary Examiner*—Ricky Q. Ngo
*Assistant Examiner*—Gary Mui
(74) *Attorney, Agent, or Firm*—The Farrell Law Firm, PC

(57) ABSTRACT

A joint detection reception apparatus and method, which are utilized irrespective of a length of an orthogonal code in a TD-CDMA communication system. The joint detection reception method for creating a system matrix associated with a joint detection receiver in the same time slot includes the steps of a) repeating and partitioning individual channelization codes having variable lengths, and creating channelization code blocks having the same lengths, b) performing a convolution operation between the repeated and partitioned channelization code blocks and a channel impulse response, and acquiring combined impulse responses, c) grouping the combined impulse responses to construct sub-block matrices for a joint detection system, d) arranging the sub-block matrices for the joint detection system to be shifted by a predetermined column distance, and constructing a joint detection system matrix, and e) extending the joint detection system matrix to a squared-format matrix to create a block-circulant squared matrix.

34 Claims, 20 Drawing Sheets ively to a length of an orthogonal code.

APPARATUS AND METHOD FOR JOINT DETECTION RECEIVING IRRESPECTIVE OF ORTHOGONAL CODE LENGTH IN MOBILE COMMUNICATION SYSTEM

PRIORITY

This application claims priority to an application entitled "JOINT DETECTION RECEIVER APPARATUS IRRESPECTIVE OF ORTHOGONAL CODE LENGTH IN MOBILE COMMUNICATION SYSTEM, AND METHOD FOR CONTROLLING THE SAME", filed in the Korean Intellectual Property Office on Sep. 7, 2002 and assigned Serial No. 2002-54062, the contents of which are hereby incorporated by reference.

BACKGROUND OF THE INVENTION

1. Field of the Invention

The present invention relates generally to a burst-synchronous CDMA (Code Division Multiple Access) communication system, and more particularly to a joint detection receiver and its control method, irrespective of a length of an orthogonal code.

2. Description of the Related Art

Prior to describing the present invention, it should be noted that the present invention is applicable to all kinds of communication systems for adapting orthogonal codes to discriminate between physical channels for use in a communication system.

An orthogonal code indicates a prescribed code having a predetermined length "n" (where, n≧1), and a total number of orthogonal codes each having the predetermined length "n" is set to "n". According to a characteristic of such an orthogonal code, if one specific orthogonal code is time-synchronized with other orthogonal codes, a cross correlation value between the specific orthogonal code and N−1 number of other orthogonal codes other than the specific orthogonal code becomes zero. Therefore, the orthogonal code has been widely used to discriminate between physical channels in a wired or wireless communication system.

For ease of description, a system matrix configuration method and its associated application for use in an inventive joint detection receiver will hereinafter be described using an exemplary Narrow Band Time Division Duplex communication scheme.

A representative example of a third generation asynchronous mobile communication system is a WCDMA (Wideband Code Division Multiple Access) system for providing a user with a voice service and a packet service. The WCDMA system is classified into a FDD (Frequency Division Duplex) system for separating a transmission frequency and a reception frequency from each other, and a TDD (Time Division Duplexing) system for adapting the same frequency as transmission/reception frequencies. The TDD system is classified into a WB-TDD (WideBand TDD) system using a chip rate of 3.84 Mcps (Mega chip per second) and a NB-TDD system using a chip rate of 1.28 Mcps. The WB-TDD and NB-TDD systems each use a specific time period called a timeslot to discriminate between uplink and downlink transmissions, however, they use an orthogonal code in the timeslot to discriminate between different channels. The orthogonal code for use in the NB-TDD and WB-TDD systems is called an OVSF (Orthogonal Variable Spreading Factor), and adjusts a length of the orthogonal code according to an amount of transmission data, thereby enabling the data transmission.

The present invention relates to a joint detection receiver for a mobile communication system, and more particularly to a method for controlling a joint detection receiver adapting an OVSF of one timeslot to a TD-CDMA system.

FIG. 1 is a schematic diagram illustrating a radio frame (also called a frame) structure having a predetermined length of 10 ms currently adapted as a basic unit of physical channel transmission in the NB-TDD system, a basic structure of a DPCH (Downlink Physical CHannel), a DwPCH (Downlink Pilot CHannel) structure, and their respective positions. The frame 101 has a predetermined length of 10 ms and 12800 chips, and is composed of two sub-frames 102. Each sub-frame 102 is one of the two sub-frames contained in the frame 101, and these two sub-frames have the same internal configuration. The sub-frame 102 has a predetermined length of 5 ms, and includes seven timeslots 104, a DwPTS (Downlink Pilot Time Slot), an UpPTS (Uplink Pilot Time Slot) 106, and a GP (Guard Period) 105. Each time slot is composed of 864 chips, and is adapted for UL (UpLink) or DL (DownLink) transmission. An upward arrow indicates a UL time slot, and a downward arrow indicates a DL time slot.

The NB-TDD system determines how many time slots from among the 7 time slots contained in one sub-frame can be used for the DL or UL transmission. A first time slot (TS #0) 103 must always be assigned with a DL, and a second time slot (TS #1) must always be assigned with a UL. The DwPTS 104 having 96 chips, the GP 105 having 96 chips, and UpPTS 106 having 160 chips exist between the first time slot TS#0 and the second time slot TS#1. The DwPTS is adapted to search for an initial cell and perform synchronization and channel estimation. The UpPTS is adapted to perform channel estimation at a base station (BS), and to establish uplink synchronization with a UE (User Equipment). Two time slots of the GP are set to DL and UL time slots, and are adapted to remove signal interference caused by multi-path delay between two signals. A switching point is adapted to discriminate between the UL and DL time slots. The NB-TDD system contains two switching points in its one sub-frame. One of the two switching points is positioned between the DwPTS and the UpPTS, and the other one is variably positioned according to a time slot allocation status.

It is assumed that a downlink physical channel 107 is set to a physical channel positioned in the first time slot TS#0, and an uplink physical channel has the same configuration as the downlink physical channel 107. The downlink physical channel includes a data symbol area 109, a midamble area 110, a data symbol area 111, and a GP area 112. Each data area of the downlink physical channel is composed of 352 chips, and transmits data using an SF (Spreading Factor) 16. The uplink physical channel having the same configuration as the downlink physical channel may use a plurality of SFs 1, 2, 4, 8, and 16. The number of physical channels or user channels distinguishable by the OVSF may be set to "k" (where, k=1, 2, . . . , 16).

Each data area is multiplied by a scrambling code of a base station (BS) of the NB-TDD communication system, and performs data transmission. The scrambling code is multiplied by the data area in chip units, and individual base stations use the same scrambling code in UL and DL transmissions. There are two kinds of scrambling codes in the scrambling code for every base station. One of the two scrambling codes is a scrambling code for an even frame, and the other one is a scrambling code for an odd frame. If time synchronization of the OVSF is not performed at regular intervals, an auto-correlation characteristic of signals is deteriorated, such that the scrambling code is adapted to reduce such deterioration of the auto-correlation characteristic and discriminate between a signal of its-related base station and other signals of other base stations.

The midamble area 110 serves as a kind of training sequence. More specifically, a specific code is selected from among a plurality of codes according to its use by means of a computer or other methods, and the midamble area 110 is created using the specific code. Each base station of the NB-TDD communication system uses a unique midamble code. The unique midamble code is created by moving a predetermined midamble code at intervals of a predetermined time using a specific basic code.

In case of the DL time slot, the midamble code is adapted to estimate a radio channel impulse response between the base station and the UE. More specifically, the midamble code is adapted to estimate a channel environment between the base station and the UE, and is adapted to recognize information of channels transferred from the base station to the UE.

In the UL time slot, the base station analyzes the midamble code to recognize which one of UEs transmits a channel signal, and the midamble code is adapted to estimate a channel environment between the UE and the base station, i.e., an impulse response of a wireless environment. The GP area 112 positioned at the end of the time slot is composed of 16 chips, and is adapted to remove signal interference between different time slots.

The DwPTS illustrated in FIG. 1 includes a GP area 113, and a synchronous-downlink (SYNC-DL) code 114. The GP area 112 of a previous time slot TS#0 and the GP area 113 creates a GP having a length of 48 chips, and this created GP having 48 chips is adapted to remove signal interference caused by a multi-path delay between the TS#0 and the DwPTS. Because the SYNC-DL code 114 being a firstly-found signal of the UE finds an initial cell, and establishes synchronization with the found cell, the above-created GP having 48 chips is determined to have a relatively long period of time and plays a very important role in a communication system. If signal interference occurs between the TS#0 and the GP area, a GP having a short period of time may be seriously affected by the signal interference. Therefore, the sum of the GP 112 positioned at the end of the TS#0 and the GP 113 of the DwPTS creates a new GP having 48 chips, thereby guaranteeing an accurate reception of the SYNC-DL code.

The SYNC DL code 114 is a signal to be firstly found by the UE, and there are 32 kinds of SYNC DL codes. The UE performs correlation between 32 kinds of code words and the strongest signal to determine the SYNC DL code, and establishes synchronization with its-related cell.

A conventional detector for use in a current mobile communication system is called a single-user receiver, which utilizes a detection technique that detects only a desired signal of one single user in a communication system and regards all the other undesired user signals and interference signals as a noise signal, respectively. For example, a matched filter detector serving as a linear filter designed to maximize an output SNR (Signal-to-Noise Ratio) for a given input signal is a single-user receiver, is not efficiently resistant to an MAI (Multiple Access Interference) and an ISI (Inter Symbol Interference) because both the MAI and the ISI are regarded as noise signals, and does not use any knowledge associated with the aforementioned mobile channel or signature sequence.

Recently, a new technique for improving the single-user receiver has been developed. A representative example of the new technique is a joint detection receiver for efficiently removing the MAI and the ISI, and is schematically illustrated in FIG. 2. Although it is assumed that the joint detection receiver is positioned at the base station in FIG. 2, the joint detection receiver may be positioned at the UE.

Referring to FIG. 2, the joint detection receiver is based on a joint detection method, which efficiently removes the MAI and the ISI while increasing the capacity of a communication system, and simultaneously detects a plurality of users of the communication system to efficiently remove the MAI and the ISI. When receiving multiple user signals at the joint detection receiver, the joint detection receiver can estimate channel impulse responses of the received multiple user signals and their multi-path signals because the detection method can simultaneously detect multiple users. Transmission and reception of the joint detection receiver are schematically illustrated in FIG. 2 for the purpose of explanation. The joint detection receiver can include a channel estimation unit 200, a joint detection unit 201, a channelization code generator 203, and a scrambling code generator 204. Individual mobile stations (MSs) 205, 206, 207, and 208 can be assigned one or more OVSF channelization codes 211, 212, 213, 214, 215, and 216 for transmitting their own signals from antennas 227, 228, 229, and 230, respectively.

The joint detection receiver is located in a BS (Base Station) 231 for receiving a signal via its own antenna 232, where the signal is transmitted from the several MSs 205, 206, 207, and 208 via antennas 227, 228, 229, and 230. The channel estimation unit 200 generates radio channel impulse responses 223 and 224 for the joint detection unit 201, where the radio channel impulse responses 223 and 224 are estimated from the received midamble code signals. The joint detection unit 201 can also be located in the MSs 205, 206, 207, and 208, respectively. The joint detection unit 201 can be basically divided into two parts, i.e., a system matrix generation block 209 for joint detection and a solution block 210 for the system matrix, such that all the desired user signals 217, 218, 219, 220, 221, and 222 transmitted within the same time slot can be detected. In this case, the solution block 210 for the system matrix is generated from the radio channel impulse responses 223 and 224, the channelization code 225, and the scrambling code 226.

The joint detection receiver can be used for a TD-CDMA communication system characterized by burst-synchronous transmission/reception in the same time slot. Because the joint detection receiver can exploit prior knowledge about both the channelization code the radio channel estimation in order to mitigate the MAI and ISI from the same time slot, it can simultaneously regenerate all the desired signals within the same time slot.

The joint detection receiver for estimating all the received signals and their multi-path signals is characterized in that it has high complexity, that is, higher than that of a single-user receiver. The complexity of the joint detection receiver is evaluated in term of the number of multiplications and the number of additions for solving system matrix equations describing the joint detection method. The complexity of the joint detection receiver is affected even by a method for constructing the system matrix for use in the joint detection receiver. However, the complexity of the joint detection receiver is dependent on the method of construction of the system matrix for use in the joint detection receiver.

According to conventional arts associated with the aforementioned joint detection receiver, only a method for constructing the system matrix for joint detection receivers with the same spreading factors in the same time slot in the form of a block-circulant matrix has been proposed. As previously stated in the NB-TDD communication system, the NB-TDD communication system may transmit orthogonal codes having different lengths in the case of uplink transmission. The above conventional art must construct different system matrices consistent with lengths of individual channel codes used for the UL transmission to create a system matrix to be used for UL transmission of the NB-TDD communication system. In this way, provided that different system matrices consistent with lengths of individual channel codes are constructed, an internal structure of the joint detection receiver may be more complicated. In conclusion, a new method for efficiently constructing the system matrix when orthogonal codes having different lengths are used for the same time slot must be developed.

SUMMARY OF THE INVENTION

Therefore, the present invention has been designed in view of the above problems, and it is an object of the present invention to provide a joint detection receiver, which is not affected by the length of orthogonal codes in a mobile communication system, which can use a joint detection receiver using one system matrix even though the orthogonal codes used for the same time slot have different lengths.

In accordance with one aspect of the present invention, the above and other objects can be accomplished by a joint detection reception method irrespective of a length of an orthogonal code in a TD (Time Division)—CDMA (Code Division Multiple Access) mobile communication system to create a system matrix associated with a joint detection receiver in a same time slot of the TD-CDMA mobile communication system, the method comprising the steps of: a) repeating and partitioning individual channelization codes having variable lengths, and creating channelization code blocks having the same lengths; b) performing a convolution operation between the repeated and partitioned channelization code blocks and a channel impulse response, and acquiring combined impulse responses; c) grouping the combined impulse responses to construct sub-block matrices for a joint detection system; and d) arranging the sub-block matrices for the joint detection system to be shifted by a predetermined column distance, and constructing a joint detection system matrix.

Preferably, the time slot may be composed of one or more areas selected from a plurality of areas, i.e., two data areas, a midamble area, and a GP (Guard Period) area located between prescribed time slots contained in an allocated wireless frame.

Preferably, the joint detection reception method may further include the step of: e) extending the joint detection system matrix to a squared-format matrix to create a block-circulant squared matrix, after performing the step (d) for constructing the joint detection system matrix.

Preferably, the joint detection reception method may further include the step of: f) after creating the block-circulant squared matrix, adding a predetermined value to a lower end position of a received signal vector corresponding to the matrix in order to provide a predetermined length equal to that of a column of the block-circulant squared matrix.

Preferably, the joint detection reception method may further include the step of: g) applying a block FFT/DFT (Fast Fourier Transform/Discrete Fourier Transform) algorithm to the block-circulant squared matrix to acquire a solution of the block-circulant squared matrix.

In accordance with another aspect of the present invention, there is provided a joint detection reception method irrespective of a length of an orthogonal code in a TD (Time Division)—CDMA (Code Division Multiple Access) communication system so as to create a system matrix associated with a joint detection receiver in a same time slot of the TD-CDMA mobile communication system, the method comprising the steps of: a) performing repetition of all channelization codes created from different bursts until a length of individual channelization code blocks is equal to a maximum spreading factor $Q_{max}$ or a predetermined value, and creating channelization code blocks having the same lengths; b) partitioning the channelization code blocks having the same lengths into at least one sub-block in order to create the channelization code blocks constructed in terms of minimum spreading factors $M^1, M^2, \ldots, M^K$ of individual spreading factor sets $Q^1, Q^2, Q^3, \ldots Q^K$; c) performing a convolution operation between at least one partitioned sub-block and a radio channel impulse response $h(k,w)$, and creating combined impulse responses $b_1^{(k)}, b_2^{(k)}, b_3^{(k)}, \ldots b_M^{(k)}$; d) grouping the K combined impulse responses $b_j^{(k)}$ into M combined impulse response sub-block matrices, arranging the M combined impulse response sub-block matrices each to be downshifted by an integer times a predetermined offset value $Q_{min}$, and constructing joint detection sub-block matrices; and e) arranging individual joint detection sub-block matrices to be downshifted by an integer times the maximum spreading factor $Q_{max}$, and constructing a joint detection system matrix.

Preferably, the time slot may be composed of one or more areas selected from a plurality of areas, i.e., two data areas, a midamble area, and a GP (Guard Period) area located between prescribed time slots contained in an allocated wireless frame.

Preferably, the joint detection reception method may further comprise the step of: f) after creating the joint detection system matrix, performing addition of sub-block columns of the system matrix until the system matrix is converted into a one block-circulant squared matrix.

Preferably, the joint detection reception method may further comprise the step of: g) after creating the block-circulant squared matrix, adding a predetermined value to a lower end position of a received signal vector corresponding to the matrix in order to provide a predetermined length equal to that of a column of the block-circulant squared matrix.

Preferably, the joint detection reception method may further comprise the step of: h) applying a block FFT/DFT (Fast Fourier Transform/Discrete Fourier Transform) algorithm to the block-circulant squared matrix to acquire a solution of the block-circulant squared matrix.

Preferably, the joint detection reception method may further comprise the step of: i) creating an estimated data vector associated with a joint detection element having different spreading factors by performing repetition of predetermined estimation data.

In accordance with yet another aspect of the present invention, there is provided a joint detection reception method irrespective of a length of an orthogonal code in a TD (Time Division)—CDMA (Code Division Multiple Access) communication system so as to create a system matrix associated with a joint detection receiver in the same time slot of the TD-CDMA mobile communication system, the method comprising the steps of: a) performing repetition of all channelization codes created from different bursts until a length of individual channelization code blocks is equal to a maximum spreading factor $Q_{max}$ or a predetermined value, and creating channelization code blocks having the same lengths; b) partitioning the channelization code blocks having the same lengths into at least one sub-block in order to create the channelization code blocks constructed in terms of individual spreading factor sets $Q^1, Q^2, Q^3, \ldots Q^K$; c) performing a convolution operation between at least one partitioned sub-block and a radio channel impulse response h(k,w), and creating combined impulse responses $b_1^{(k)}, b_2^{(k)}, b_3^{(k)}, \ldots b_M^{(k)}$; d) grouping the K combined impulse responses $b_j^{(k)}$ into one sub-block matrix, arranging at least one combined impulse response creating the sub-block matrix to be downshifted by an integer times a predetermined offset value $Q^k$, and constructing a sub-block matrix of a joint detection system matrix; and e) arranging the N sub-block matrices to be downshifted by an integer times a predetermined factor $Q_{max}$, and constructing a joint detection system matrix.

Preferably, the time slot may be composed of one or more areas selected from a plurality of areas, i.e., two data areas, a midamble area, and a GP (Guard Period) area located between prescribed time slots contained in an allocated wireless frame.

Preferably, the joint detection reception method may further comprise the step of: f) after creating the joint detection system matrix, performing addition of sub-block columns of the system matrix until the system matrix is converted into a one block-circulant squared matrix.

Preferably, the joint detection reception method may further comprise the step of: g) after creating the block-circulant squared matrix, adding a predetermined value to a lower end position of a received signal vector corresponding to the matrix in order to provide a predetermined length equal to that of a column of the block-circulant squared matrix.

Preferably, the joint detection reception method may further comprise the step of: h) applying a block FFT/DFT (Fast Fourier Transform/Discrete Fourier Transform) algorithm to the block-circulant squared matrix to acquire a solution of the block-circulant squared matrix.

Preferably, the joint detection reception method may further comprise the step of: i) creating an estimated data vector associated with a joint detection element having different spreading factors by performing repetition of predetermined estimation data.

Preferably, the joint detection reception method may further comprise the steps of: j) after creating combined impulse responses $b_1^{(k)}, b_2^{(k)}, b_3^{(k)}, \ldots b_M^{(k)}$ at the step (c), grouping the K combined impulse responses $b_j^{(k)}$ into one sub-block matrix, arranging $\Sigma Q_{max}/Q^k$ number of grouped impulse responses to be downshifted by an integer times a predetermined offset value $Q^k$ in ascending numerical order of a specific variable j, and constructing a sub-block matrix of a joint detection system matrix; and k) arranging the N sub-block matrices to be downshifted by an integer times a predetermined factor $Q_{max}$, and constructing a joint detection system matrix.

Preferably, the time slot may be composed of one or more areas selected from a plurality of areas, i.e., two data areas, a midamble area, and a GP (Guard Period) area located between prescribed time slots contained in an allocated wireless frame.

Preferably, the joint detection reception method may further comprise the step of: l) after creating the joint detection system matrix, performing addition of sub-block columns of the system matrix until the system matrix is converted into a one block-circulant squared matrix.

Preferably, the joint detection reception method may further comprise the step of: m) after creating the block-circulant squared matrix, adding a predetermined value to a lower end position of a received signal vector corresponding to the matrix in order to provide a predetermined length equal to that of a column of the block-circulant squared matrix.

Preferably, the joint detection reception method may further comprise the step of: n) applying a block FFT/DFT (Fast Fourier Transform/Discrete Fourier Transform) algorithm to the block-circulant squared matrix to acquire a solution of the block-circulant squared matrix.

Preferably, the joint detection reception method may further comprise the step of: o) creating an estimated data vector associated with a joint detection element having different spreading factors by performing repetition of predetermined estimation data.

In accordance with yet a further another aspect of the present invention, there is provided a joint detection reception apparatus irrespective of a length of an orthogonal code in a TD (Time Division)—CDMA (Code Division Multiple Access) communication system to create a system matrix associated with a joint detection receiver in a same time slot of the TD-CDMA mobile communication system, comprising: a channelization code generator for generating OVSFs (Orthogonal Variable Spreading factors) having at least one length; a channel estimator for detecting midamble information from the received one time slot, and generating a channel impulse response using the detected midamble information; and a joint detection unit for performing the steps of a) repeating and partitioning individual channelization codes having variable lengths, and creating channelization code blocks having the same lengths; b) performing a convolution operation between the repeated and partitioned channelization code blocks and a channel impulse response, and acquiring combined impulse responses; c) grouping the combined impulse responses to construct sub-block matrices for a joint detection system; and d) arranging the sub-block matrices for the joint detection system to be shifted by a predetermined column distance, and constructing a joint detection system matrix.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
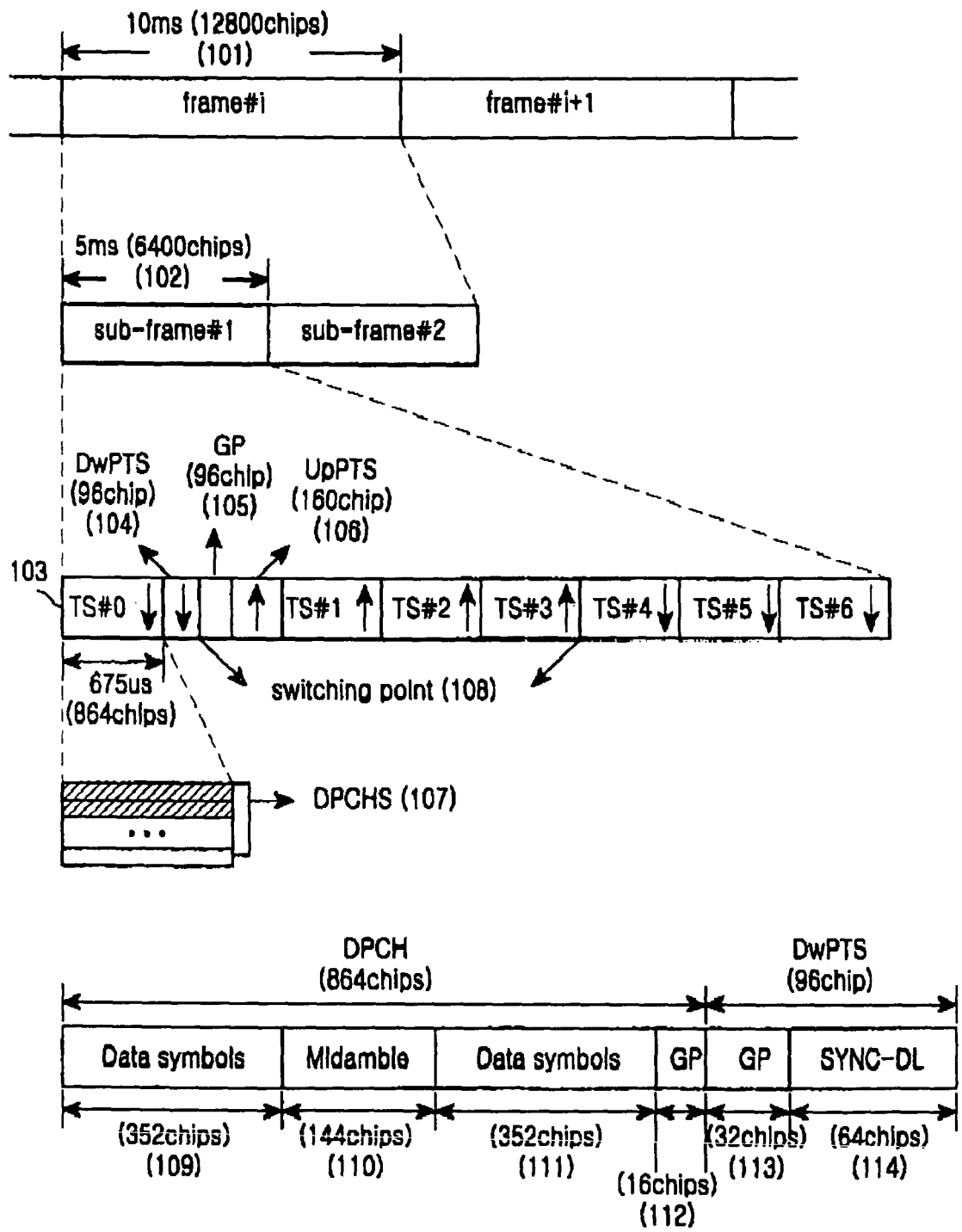
FIG. 1 is a schematic diagram illustrating a frame structure of a TD-CDMA system based on a conventional burst-synchronization scheme.

Preferred embodiments of the present invention will be described in detail herein below with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Although an NB-TDD communication scheme is used for the present invention as an example, for the convenience of description, it should be understood that its description does not restrict the scope and spirit of the invention.

A burst-synchronous CDMA communication system such as a TD-CDMA communication system uses a burst to perform two-way communications.

Figure 2:
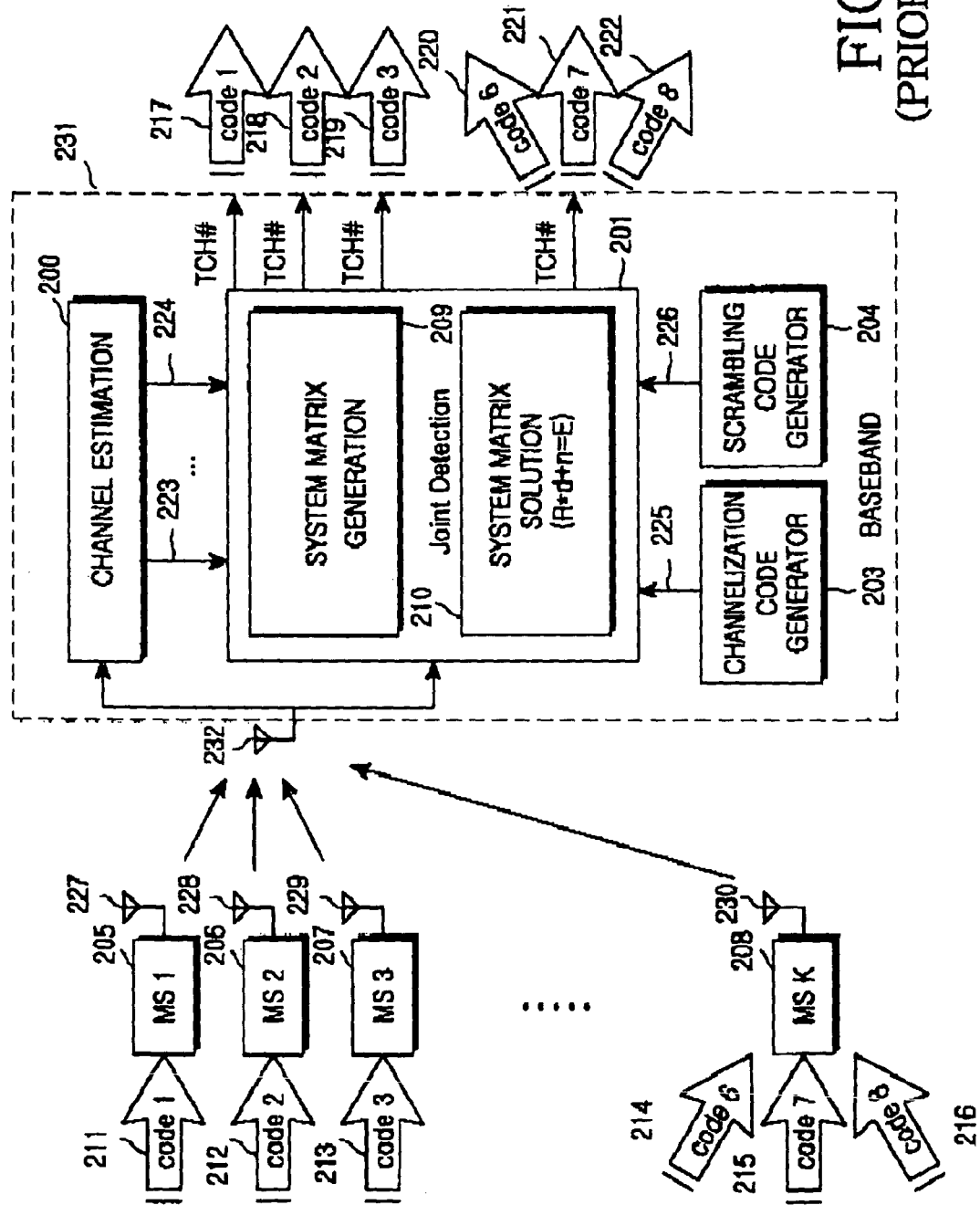
FIG. 2 is a schematic diagram illustrating transmission and reception of a joint detection receiver.

The joint detection receiver illustrated in FIG. 2 calculates channel responses of all the received signals, and uses a joint detection method for simultaneously detecting all the received signals according to the calculated channel responses in such a way that the joint detection receiver can improve a QoS of a desired signal. The joint detection method simultaneously detects a plurality of users of a communication system jointly increasing communication capacity. Transmission and reception operations of the joint detection receiver are schematically illustrated in FIG. 2 for the purpose of explanation.

As described above, the joint detection receiver is characterized in that it improves a reception performance of a desired signal in the time slot by mitigating the MSI and ISI generated from the same time slot, such that it has high complexity higher than that of a single-user receiver. The complexity of the joint detection receiver is evaluated in terms of the number of multiplications and the number of additions for solving system matrix equations describing the joint detection method. The complexity of the joint detection receiver can also be determined even by a method for constructing the system matrix equations. More specifically, the complexity of the joint detection receiver is determined by the number of multiplications and the number of additions for use in such joint detection by means of both the system matrix configuration method and the system matrix. However, the complexity of the joint detection receiver is dependent on how the system matrix for use in the joint detection receiver is constructed.

According to conventional arts of the aforementioned joint detection receiver, there has been proposed a method for constructing the system matrix for joint detection receivers with the same spreading factors in the same time slot in the form of a block-circulant matrix. However, there has not been proposed a method for constructing the system matrix for the joint detection receiver in the form of a block-circulant matrix when simultaneously using OVSFs (i.e., orthogonal codes having different lengths) in the same time slot.

Figure 3:
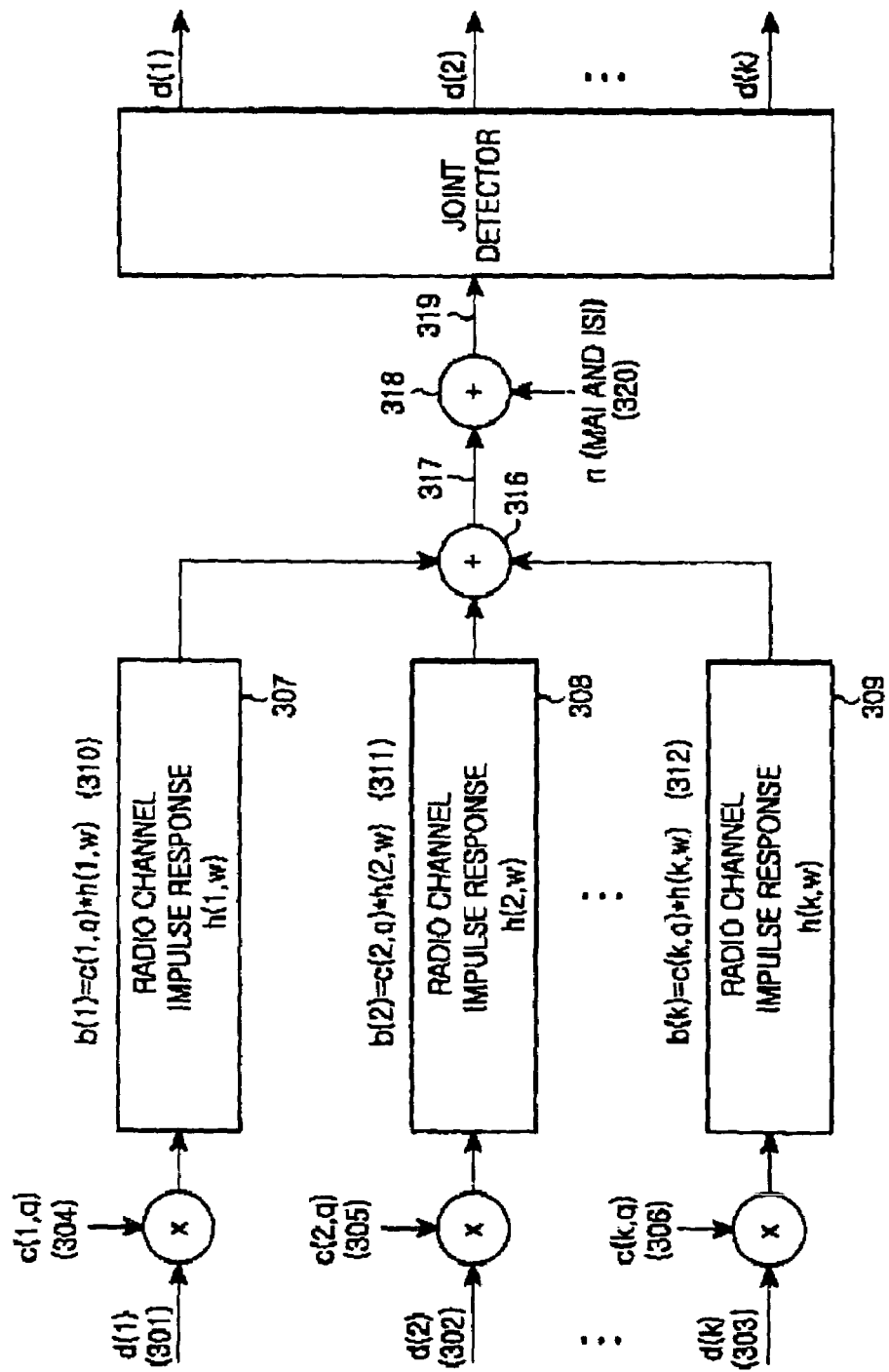
FIG. 3 is a schematic diagram illustrating a joint detection system model for a burst-synchronous TD-CDMA system.

FIG. 3 is a block diagram illustrating a TDMA (Time Division Multiple Access) system functioning as one of a third generation asynchronous mobile communication systems, and schematically illustrates the joint detection system available for the WB-TDD and NB-TDD systems. A method for constructing the system matrix for the joint detection receiver and a method for extending the so-constructed system matrix into the block-circulant matrix are schematically illustrated in FIG. 3.

Referring to FIG. 3, the joint detection system model for the burst-synchronous TD-CDMA system is schematically illustrated for the purpose of clarifying the inventive method, which constructs the system matrix for the joint detection receiver and extends the so-constructed system matrix into a block-circulant matrix. The following parameters will hereinafter be defined as follows for the convenience of description. A sample rate $f_s$ of the received signal is equal to a chip rate $1/T_c$, for example, $f_s$ is equal to 1.28 Mcps in the NB-TDD system or 3.84 Mcps in the WB-TDD system. W is the estimated window length of the known channel impulse responses 307, 308, and 309 estimated from the received midamble code signals. k (k=1, 2, ..., K) is the number of simultaneous users in the same time slot. $Q^k$ is the spreading factor corresponding to the above users, respectively, $Q^k \in \{Q^1, Q^2, \ldots, Q^K\}$. $c^k$ is the channelization codes $c^k \in \{c^1, c^2, \ldots, c^K\}$ (304, 305, and 306) corresponding to the above spreading factors, respectively. $N^k$ is the length of data blocks corresponding to the above spreading factors, respectively, where $N^k \in \{N^1, N^2, \ldots, N^K\}$. $Q_{min}$ is a minimum spreading factor equal to a minimum value of $\{Q^1, Q^2, \ldots, Q^K\}$. $Q_{max}$ is a maximum spreading factor equal to one certain value, for example, $Q_{max}=16$ or $Q_{max}$=the maximum value of $\{Q^1, Q^2, \ldots, Q^K\}$.

$M^k$ is the number of channelization codes during $Q_{max}$, where $M^k \in \{M^1, M^2, \ldots, M^K\}$ and $M^k=Q_{max}/Q^k$, k=1, 2, ..., K. $Q_{min}$ is a minimum value in the spreading factors $\{Q^1, Q^2, \ldots, Q^K\}$ corresponding to the above users. M is the number of channelization codes $\{M^1, M^2, \ldots, M^K\}$ during $Q_{max}$. $N_{max}$ is a maximum value of the lengths $\{N^1, N^2, \ldots, N^K\}$ of data blocks corresponding to the above spreading factors. $N_{min}$ is a minimum value of the lengths $\{N^1, N^2, \ldots, N^K\}$ of data blocks corresponding to the above spreading factors. N is equal to the value $N_{max}/(Q_{max}/Q_{min})$.

Next the joint detection system model for a burst-synchronous TD-CDMA system will hereinafter be described in detail. The signals d(1) (301), d(2)(302), and d(k)(303) to be transmitted from different users are multiplied by their respective channelization codes c(1,q)(304), c(2,q)(305), and c(k,q)(306), and are then transmitted to the joint detection receiver over channels. The channelization codes c(1,q)(304), c(2,q)(305), and c(k,q)(306) are repeated in the same length as their respective channelization codes c(1,q)(304), c(2,q)(305), and c(k,q)(306). The channels can be estimated by convolution between the channel codes c(1,q)(304), c(2,q)(305), and c(k,q)(306) and radio channel impulse responses of individual channel codes, and the convolution result denoted by $\{b^{(k)}\}$ 310, 311, and 312 can be represented by the following Equation 1. The above repeated signals are multiplied by the combined impulse responses $\{b^{(k)}\}$ 310, 311, and 312 obtained by convolution between the channelization codes $\{c(k, q)\}$ 304, 305, and 306 corresponding to the above spreading factors and the radio channel impulse responses $\{h(k, w)\}$ 307, 308, and 309, respectively.

$$b^{(k)}=c(k,q)*h(k,w) \quad \text{[Equation 1]}$$

Referring to Equation 1, k represents the index of channelization codes c(k, q) 304, 305, and 306 (where $q \in [1, 2, 3, \ldots, Q^k]$). The known radio channel impulse response is denoted by h(k, w) 307, 308, and 309 (where $w \in [1, 2, 3, \ldots, W]$), and can be jointly estimated from the received midamble code signals.

The combined impulse responses $\{b^{(k)}\}$ 310, 311, and 312 are convolution-processed by the repeated signals, and the summation (316) of all the above convolution-processed results can generate the signal 317. Then, a data vector $e^{(ka)}$ (319) finally received at an antenna ka is created by adding the signal 317 and the noise and inter-cell interference signal 320 at a prescribed location 318, and can be represented by the following Equation 2:

$$e^{(ka)}=\Sigma b^{(k,ka)}*U_{Q^k}[d(k)]+n^{(ka)} \quad \text{[Equation 2]}$$

Referring to Equation 2, $U_{Qk}[d(k)]$ represents a result of up-sampling d(k) caused by a factor $Q^k$ without using the last ($Q^k-1$) zeros, where ka=1, ..., $K_a$, $e^{(ka)} \in C^{NQ_{max}+W-1}$. $n^{(ka)} \in C^{NQ_{max}+W-1}$ represents the noise and inter-cell interference signal created at the ka-th antenna.

The above Equation 2 can also be re-written in the form of a matrix equation for all the antennas as denoted by the following Equation 3.

$$e=G \cdot d+n, \quad G \in C^{Ka(N*Q_{max}+W-1) \times N*K} \quad \text{[Equation 3]}$$

Referring to Equation 3, the matrix G is a system matrix of a joint detection receiver with a prescribed dimension of $Ka(N*Q_{max}+W-1) \times (N*K)$, d is a transmission data vector with a dimension of $(N*K) \times 1$, n is a noise plus interference vector with a dimension of $K_a(N*Q_{max}+W-1) \times 1$, and e (319) is a received data vector with a dimension of $K_a(N*Q_{max}+W-1) \times 1$.

The aforementioned method for constructing the joint detection system matrix G may significantly increase the complexity of the joint detection receiver. Herein below, the well-known configuration and method of the joint detection system matrix G with the same spreading factors will first be described. Then, the fact that the above well-known method cannot be applied to a joint detection process using variable spreading factors will be described. Finally, an inventive method for constructing a system matrix with variable spreading factors will be described.

It is assumed that the number $K_a$ of antennas is equal to 1 in the present invention. It should also be noted that the above assumptions are only for the purpose of clarification without limiting the scope of the present invention and these descriptions are also applicable to the antenna number $K_a$ higher than 1.

For a better understanding of the present invention, a circulant matrix and a block-circulant matrix need to be described. The characteristic of a circulant matrix R is uniquely determined by its first column and can be diagonalized by the following Equation 4 describing a Fourier matrix.

$$R=F_n \Lambda F_n^H \quad \text{[Equation 4]}$$

Referring to Equation 4, $$[F_n]_{j,k} = \frac{1}{\sqrt{n}}\left(e^{\frac{2\pi i(j-1)(k-1)}{n}}\right), 1 \le j, k \le n,$$

and $\Lambda$ is an eigenvalue matrix of the circulant matrix R.

The block-circulant matrix comprises DJ×DL blocks, where each block is a J×L circulant matrix. The block-circulant matrix can also be diagonalized by the above Fourier matrix. In other words, the block-circulant matrix can be transformed by the Fourier matrix into the diagonal blocks, each containing an eigenvalue of a corresponding circulant sub-block matrix.

Figure 4:
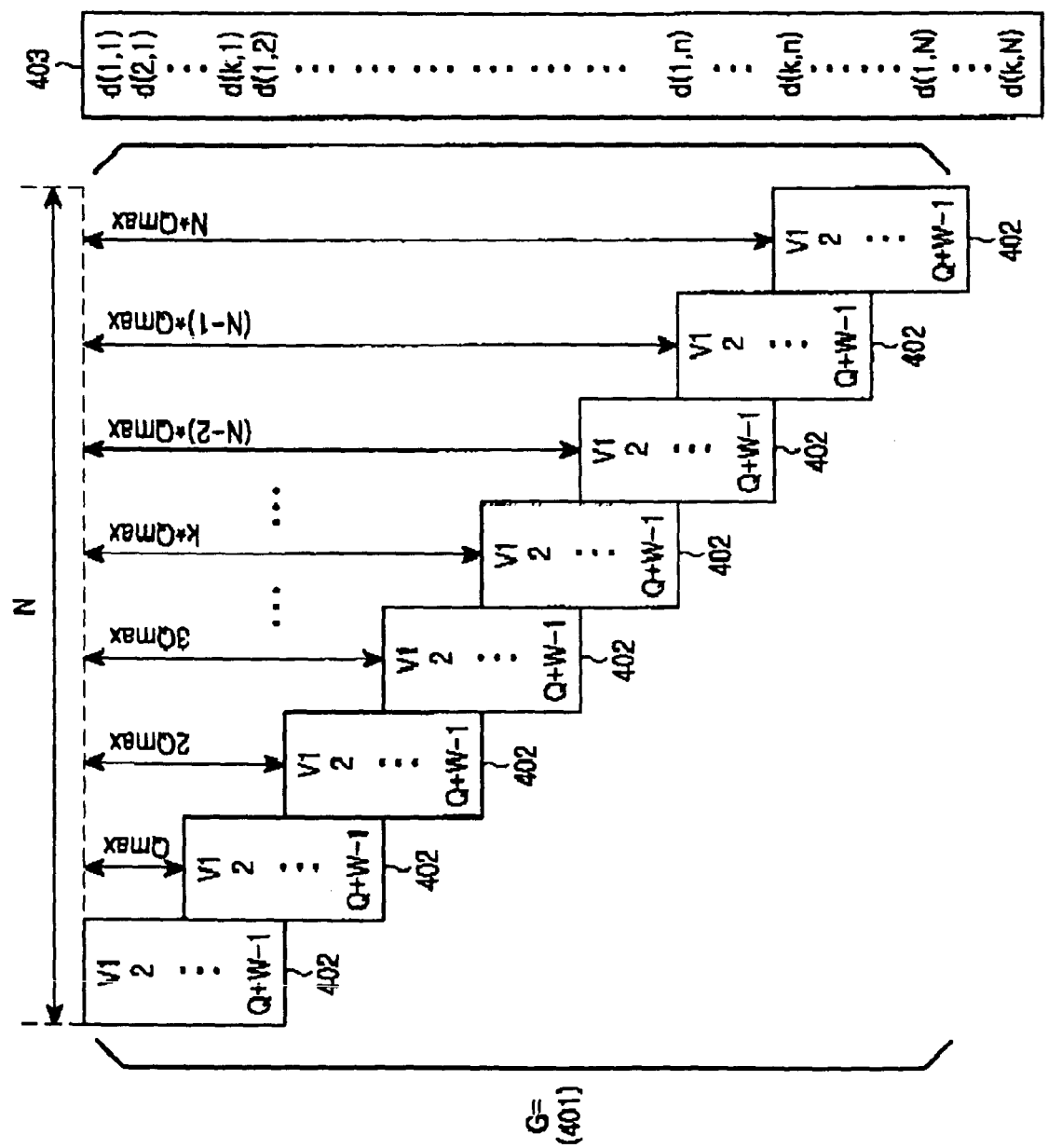
FIG. 4 is a schematic diagram illustrating construction of a system matrix G for joint detection with the same spreading factors in the same time slot.

Referring to FIG. 4, provided that all the users are assigned with the same spreading factors in one time slot, the joint detection system matrix G(401) can be constructed in the form of a one block-circulant matrix. Because all the users K are assigned the same spreading factors and their combined impulse responses $\{b^{(k)}\}$ have the same sizes, the combined impulse responses $\{b^{(k)}\}$ can each be simultaneously partitioned into a plurality of impulse responses and can be combined with a sub-block matrix V(402) such that the block matrix G(401) can be extended to the block-circulant matrix. Individual data vectors 403 for all the users K are alternatively partitioned, respectively. The block matrix G (401) is created by controlling the spreading factor $Q_{max}$ to downshift the same sub-matrix V(402) until the number of the downshifting operations is equal to the length N of data blocks.

Figure 5:
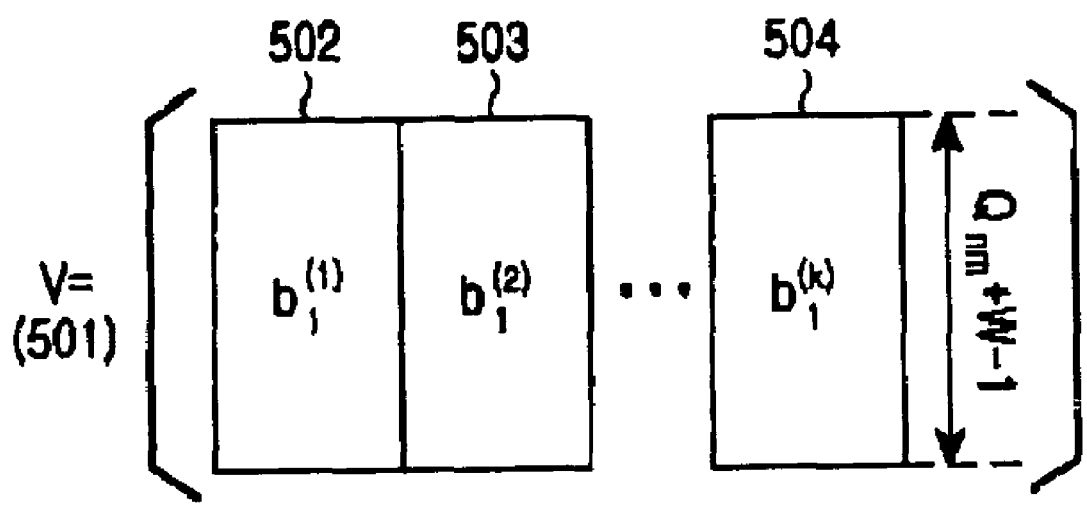
FIG. 5 is a schematic diagram illustrating construction of a system sub-matrix V for joint detection with the same spreading factors.

Referring to FIG. 5, the sub-matrix V(501) will hereinafter be described. Combined impulse responses 502, 503, and 504 can be simultaneously partitioned, and can be combined with the sub-block matrix V(501), such that the generated sub-block matrix G(401) can be extended to the block-circulant matrix.

Figure 6:
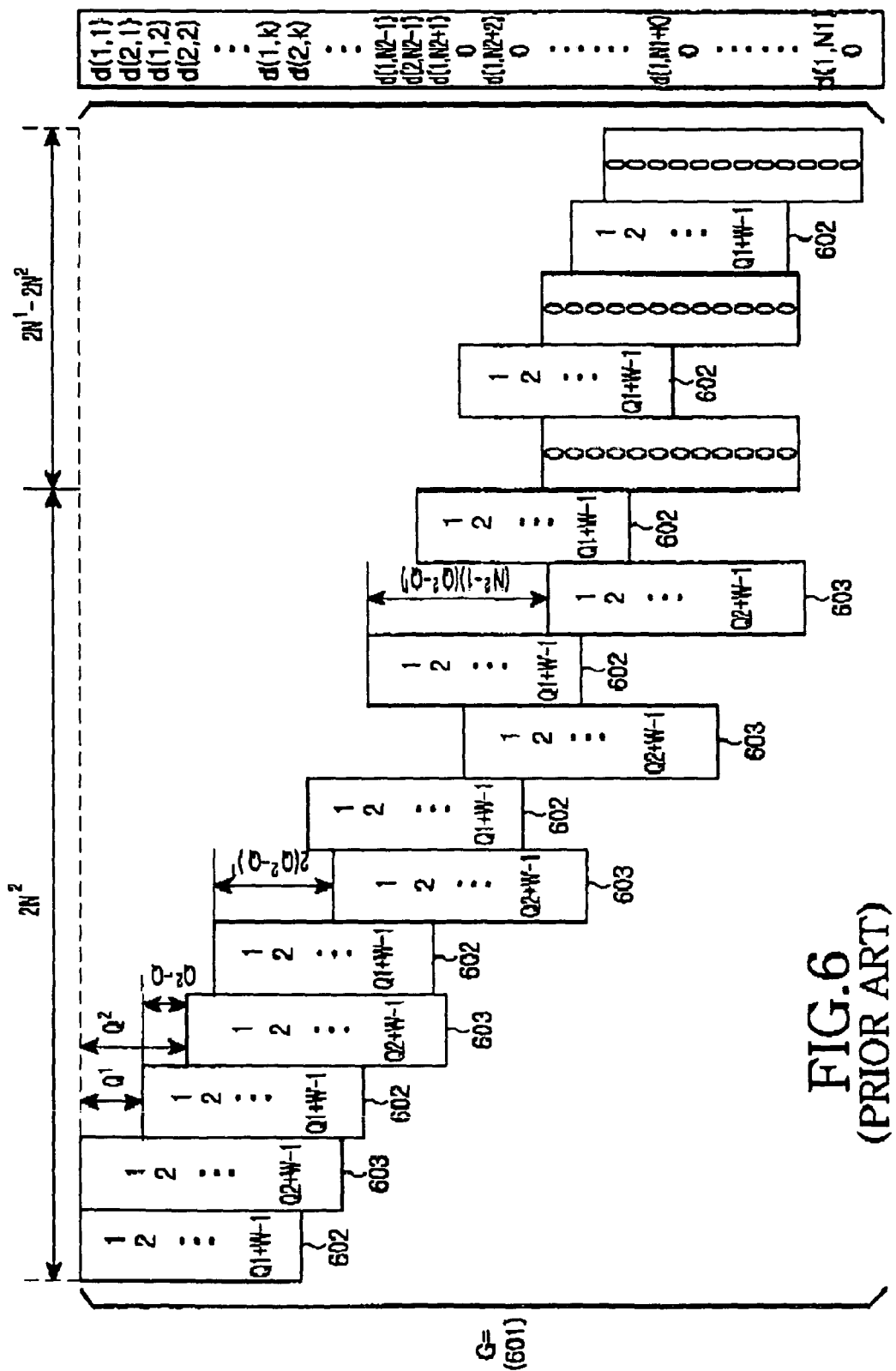
FIG. 6 is a schematic diagram illustrating construction of a system matrix G for joint detection with different spreading factors.

Referring to FIG. 6, it is assumed that the number $K_a$ of antennas is equal to 1 and the number K of users is equal to 2 in the present invention. It should be noted that the above assumption is only for the purpose of clarification without limiting the scope of the present invention and that these descriptions can also be applied to the case where the number $K_a$ of antennas is higher than 1 and the number K of users is higher than 1. The spreading factor $Q^1$ is equal to $2Q^2$, which means that the number $N^2$ of data packets is equal to $2N^1$.

Problems arise when the aforementioned method for the same spreading factors is directly applied to the variable spreading factors, and thus their detailed description will hereinafter be described.

Referring again to FIG. 6, it is obvious that the system matrix G(601) with different spreading factors is not the block-circulant matrix, which is constructed from the combined impulse responses 602 and 603 of different users having different spreading factors. Although it is necessary for the system matrix G(601) to calculate a prescribed solution for the system matrix and apply the calculated solution to the joint detection receiver, it may unavoidably increase system complexity in the case of solving the above system equations because some fast algorithms such as a block-based FFT/DFT (Fast Fourier Transform/Discrete Fourier Transform) algorithm cannot be applied to the case of solving the system equations.

There has not been proposed a new method for the different spreading factors. Therefore, a need exists for a new method for constructing the joint detection system matrix with variable spreading factors. One object of the present invention is to provide a method for solving the aforesaid problems.

Figure 7A:
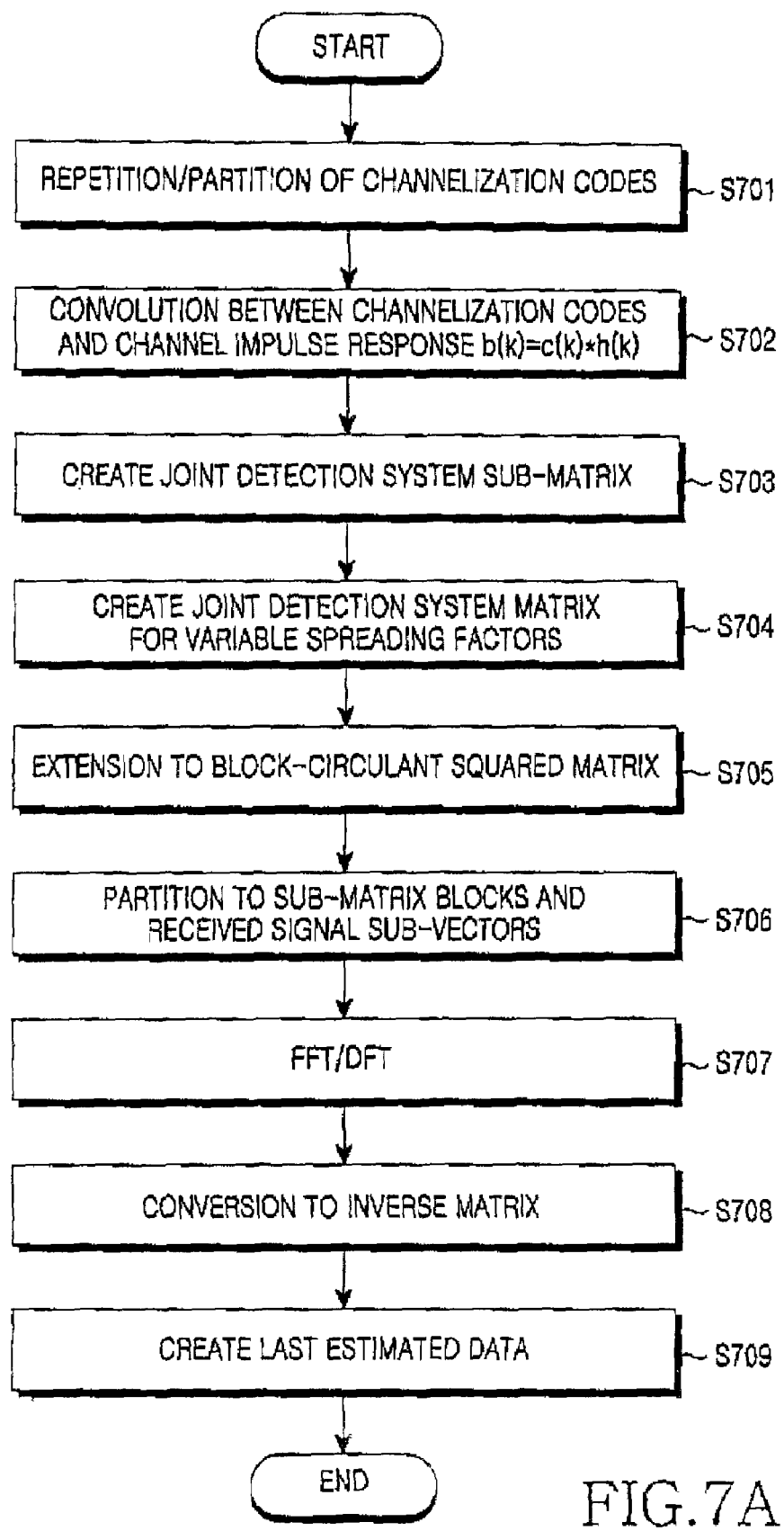
FIG. 7A is a flow chart illustrating a joint detection method for use in a joint detection receiver in accordance with the present invention.
Figure 7B:
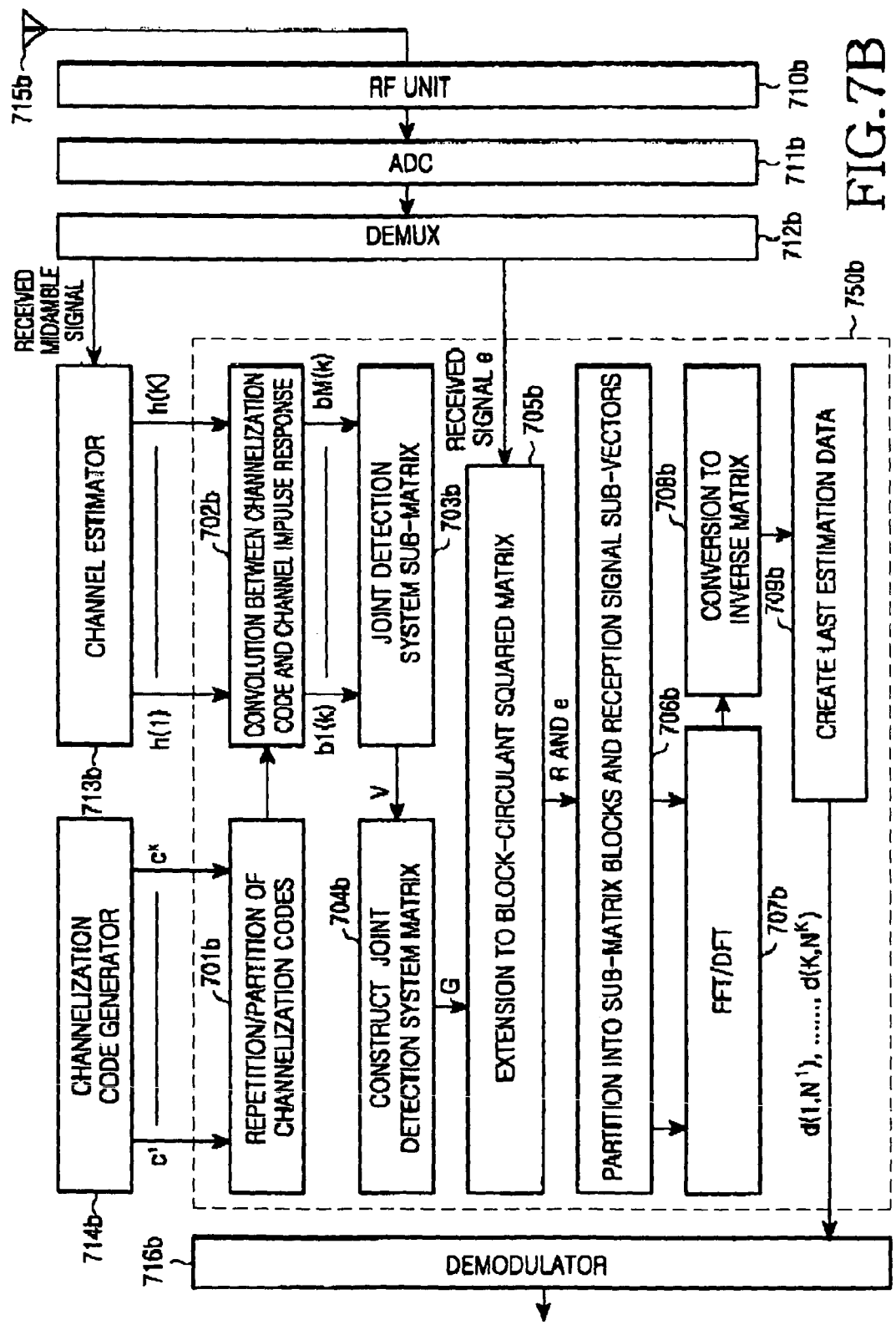
FIG. 7B is a block diagram illustrating hardware architecture of a joint detection receiver in accordance with the present invention.

A control method for a joint detection receiver with the variable spreading factors and hardware architecture of the joint detection receiver are illustrated in FIGS. 7A and 7B, respectively.

The control method for the joint detection receiver will hereinafter be described with reference to FIG. 7A. Repetition and partition of channelization codes having variable lengths are performed at step S701. Convolution between the repeated and partitioned channelization codes and a prescribed channel impulse response is performed to create a combined impulse response at step S702, and then a system sub-matrix for joint detection is constructed at step 703. A system matrix for joint detection (i.e., a joint detection system matrix) with variable spreading factors is constructed at step 704. The so-constructed joint detection system matrix G with different spreading factors is extended to a block-circulant squared matrix R at step S705, and a received signal vector is assigned a predetermined value such as "0". A first block-column matrix and the received signal vector are each divided into D sub-matrix blocks with a predetermined size J×L and D received signal sub-vectors with a predetermined size J×1 at step 706. All the row vectors with the same row numbers are derived from the extended first block-column matrix and the received signal vector to create one new sub-block matrix and one new received signal sub-vector. In this case, the extended first block-column matrix is divided into the D sub-matrix blocks with the size J×L and the D received signal sub-vectors with the size J×1. The above new sub-block matrix and one new received signal sub-vector can be FFT- or DFT-transformed, respectively, at step S707. The above FFT/DFT-transformed results are fed back to original positions within the sub-matrix block and the received signal sub-vector prior to the FFT/DFT transformation at step S707. The matrix inversion is performed on the FFT/DFT-transformed D sub-matrix blocks. In this case, any standard matrix pseudo-inversion algorithm can be applied to the matrix inversion, and the matrix-inversion results are multiplied by the FFT/DFT-transformed received signal vector. Then, multiplication results are IFFT/IDFT-transformed at step S708 in the same way as at step S707. Some data elements in first $K^*N_{max}$ elements of an estimated vector are removed, which means that some data elements are repeated. Alternatively, the repeated estimation vector can be accumulated to acquire a reception (Rx) diversity. A final estimated data sequence may be created for the joint detection with different spreading factors at step S709.

The hardware architecture of the joint detection receiver is schematically illustrated in FIG. 7B. As illustrated in FIG. 7B, the joint detection receiver includes an antenna unit 715*b*, an ADC (Analog-to-Digital Converter) 711*b*, a demultiplexer (DEMUX) 712*b*, a DSP (Digital Signal Processor) 750B, a channelization code generator 714*b*, a midamble-code-based channel estimator 713*b*, and a demodulator 716*b*. The antenna 715*b* receives signals transmitted from MSs or one BS. The ADC 711*b* can digitalize the above signal received from the antenna 715*b* at a prescribed sampling rate $f_s$ equal to a chip rate $1/T_c$, for example, $f_s$ is equal to 1.28 Mcps or 3.84 Mcps. The digitized signal can be demultiplexed into a received midamble signal and a received signal by means of the demultiplexer 712*b*. In this case, the received midamble signal is transferred to the midamble-code-based channel estimator 713*b*. The midamble-code-based channel estimator 713*b* generates estimation channel impulse responses, and the received signal is transferred to the DSP 750*b*.

As illustrated in FIG. 7B, the control method of the inventive joint detection receiver can be implemented in the DSP 750*b*, which comprises a plurality of components 701*b*, 702*b*, 703*b*, 704*b*, 705*b*, 706*b*, 707*b*, 708*b*, and 709*b* Alternatively, the components 701*b*, 702*b*, 703*b*, 704*b*, 705*b*, 706*b*, 707*b*, 708*b*, and 709*b* can also be executed in other programmable devices. These steps will hereinafter be described in more detail.

Repetition and partition of channelization codes having variable lengths are performed in a repetition/partition of channelization codes block (701*b*). Convolution between the repeated and partitioned channelization codes and a prescribed channel impulse response is performed to create a combined impulse response in a convolution between channelization code and channel impulse response block (702*b*), and then a system sub-matrix for joint detection is constructed in a joint detection system sub-matrix block (703*b*). A system matrix for joint detection (i.e., a joint detection system matrix) with variable spreading factors is constructed in a construct joint detection system matrix block (704*b*). The so-constructed joint detection system matrix G with different spreading factors is extended to a block-circulant squared matrix R in an extension to block-circulant squared matrix block (705*b*), and a received signal vector is assigned a predetermined value such as "0". A first block-column matrix and the received signal vector are each divided into D sub-matrix blocks with a predetermined size J×L and D received signal sub-vectors with a predetermined size J×1 in a partition into sub-matrix blocks and reception signal sub-vectors block (706*b*). All the row vectors with the same row numbers are derived from the extended first block-column matrix and the received signal vector to create one new sub-block matrix and one new received signal sub-vector. In this case, the extended first block-column matrix is divided into the D sub-matrix blocks with the size J×L and the D received signal sub-vectors with the size J×L. The above new sub-block matrix and one new received signal sub-vector can be FFT- or DFT-transformed, respectively, in a FFT/DFT block (707b). The above FFT/DFT-transformed results are fed back to original positions within the sub-matrix block and the received signal sub-vector prior to the FFT/DFT transformation in the FFT/DFT block (707b). The matrix inversion is performed on the FFT/DFT-transformed D sub-matrix blocks. In this case, any standard matrix pseudo-inversion algorithm can be applied to the matrix inversion, and the matrix-inversion results are multiplied by the FFT/DFT-transformed received signal vector. Then, multiplication results are IFFT/IDFT-transformed in the conversion to inverse matrix (708b) in the same way as in a 707b block. Some data elements in first $K*N_{max}$ elements of an estimated vector are removed, which means that some data elements are repeated. Alternatively, the repeated estimation vector can be accumulated to acquire a reception (Rx) diversity. A final estimated data sequence may be created for the joint detection with different spreading factors in a created last estimation data block (709b). Output signals of the DSP 750b are transferred to the demodulator 716b, and are further processed by the demodulator 716b and other function units.

1. First Preferred Embodiment

Figure 8:
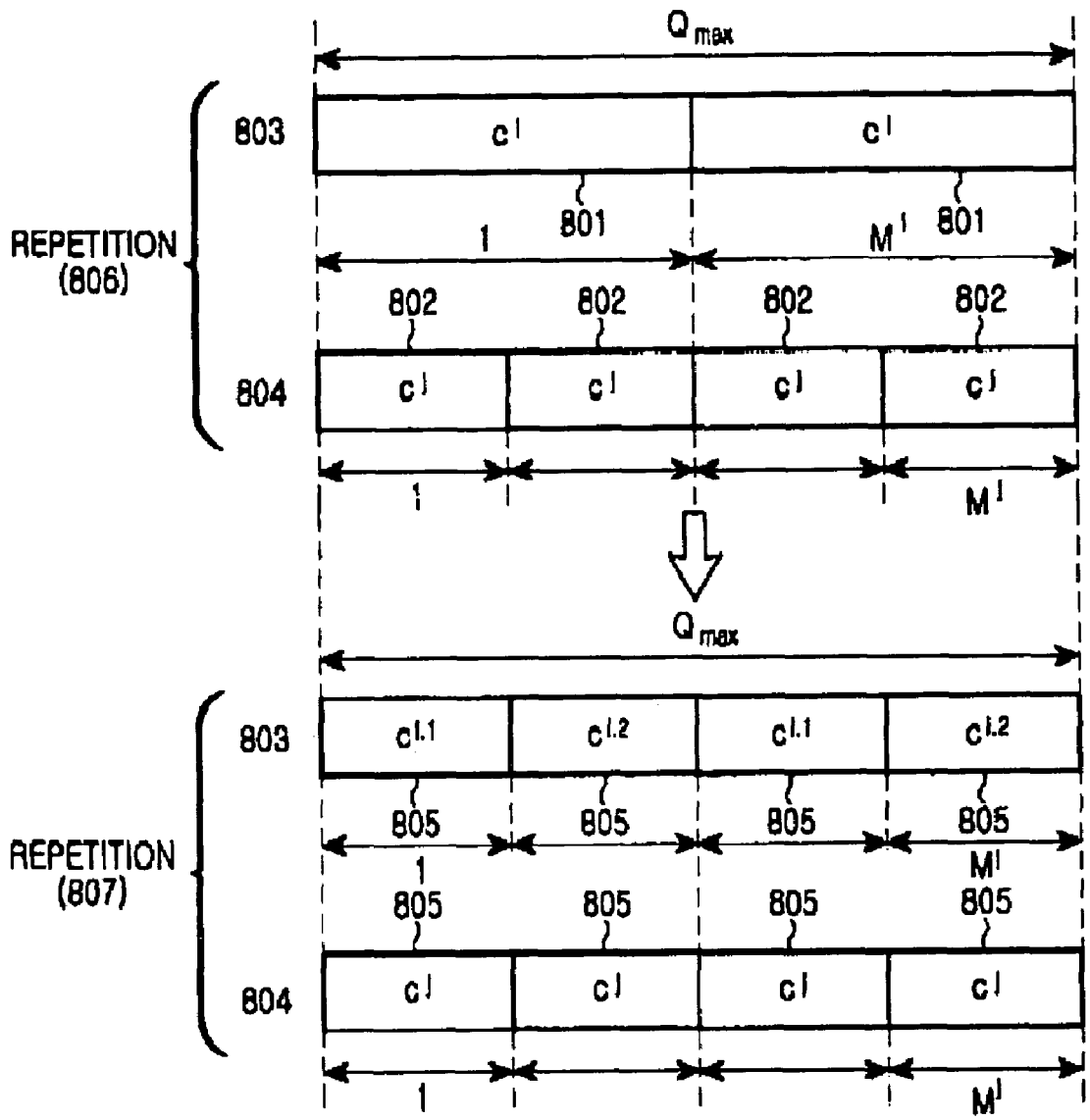
FIG. 8 is a conceptual diagram illustrating repetition and partition of different channelization codes with the variable length in accordance with a preferred embodiment of the present invention.
Figure 9:
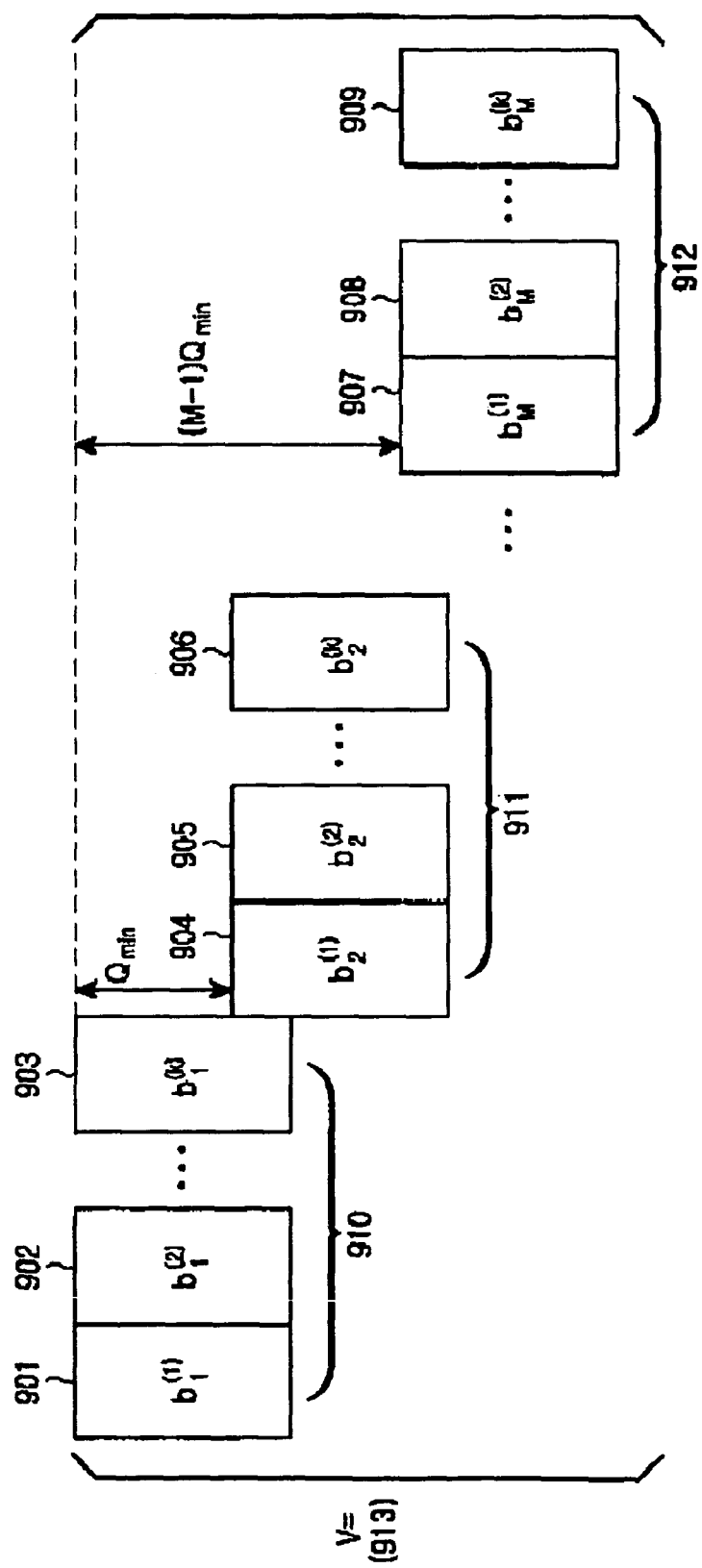
FIG. 9 is a conceptual diagram illustrating construction of a system sub-matrix for joint detection with the variable spreading factors in the same time slot in accordance with a preferred embodiment of the present invention.
Figure 10:
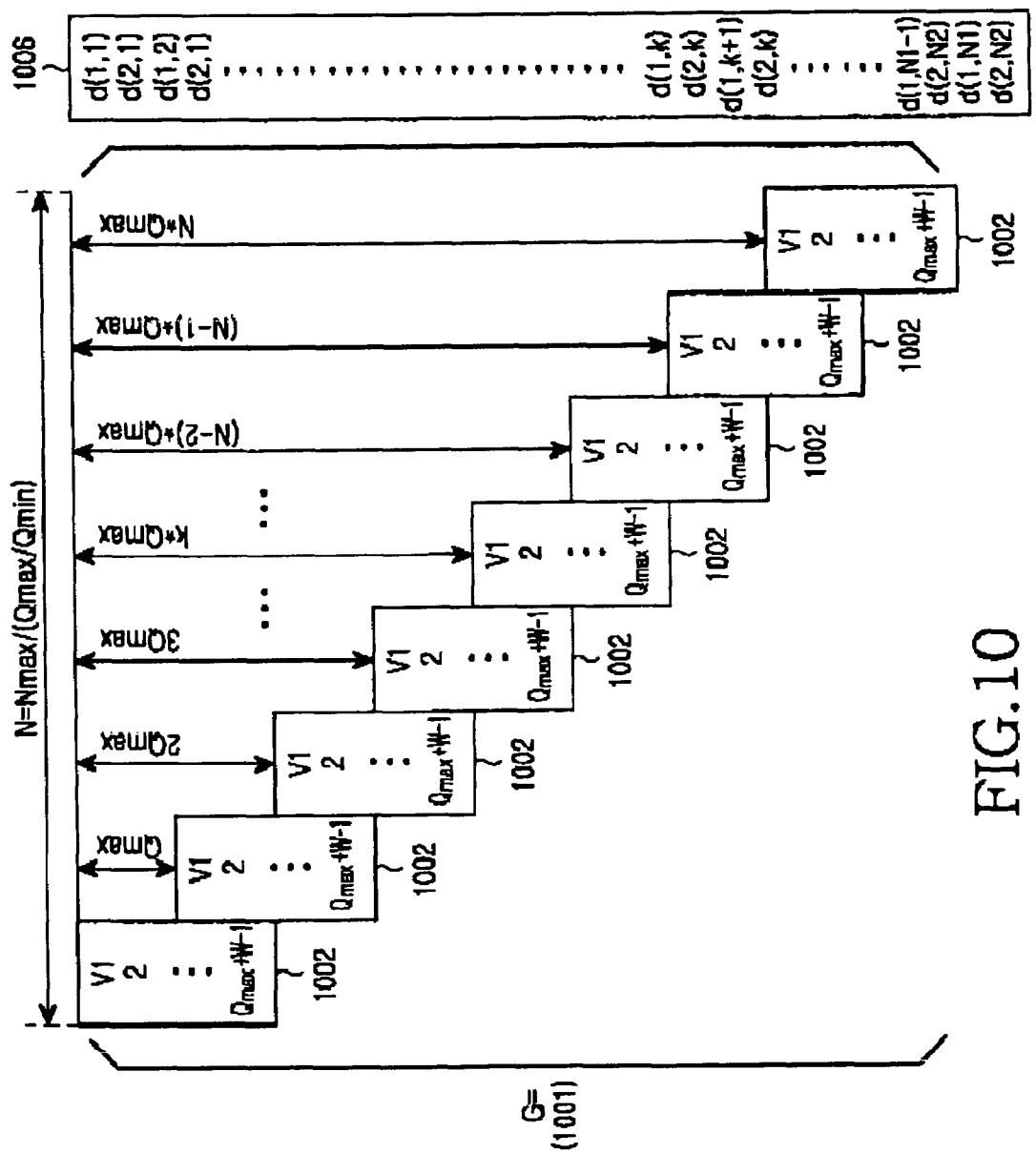
FIG. 10 is a schematic diagram illustrating construction of a system matrix for joint detection with the variable spreading factors in the same time slot in accordance with a preferred embodiment of the present invention.

Referring to FIGS. 8, 9, and 10, a first method for constructing a system matrix for joint detection receivers with variable spreading factors in the form of a block-circulant matrix will be described in the first preferred embodiment. The first method solves problems incurred when the joint detection matrix construction having the same spreading factors is directly applied to different spreading factors, and can extend a joint detection matrix with different spreading factors to the block-circulant matrix. The first method will hereinafter be discussed in detail.

Referring to FIG. 8, according to the first method of the present invention, all the channelization codes 801 and 802 created from different bursts are repeated at a process 806 until channelization code blocks 803 and 804 each have the same length as a maximum spreading factor $Q_{max}$ or a predetermined value such as "16". The channelization codes 801 and 802 created from different bursts with different spreading factors can be constructed in the form of channelization code blocks 803 and 804 each having the same length. Thereafter, the repeated channelization code blocks 803 and 804 with either the length of $Q_{max}$ or one predetermined value can be further partitioned into several sub-blocks 805 in terms of minimum spreading factors $M^1$, $M^2$, ..., $M^K$ of individual spreading factor sets $Q^1$, $Q^2$, ..., $Q^K$ at a process 807. Consequently, all the partitioned sub-blocks 805 created from different bursts having the different spreading factors each have the same length as the minimum spreading factors $M^1$, $M^2$, ..., $M^K$ of the spreading factor sets $Q^1$, $Q^2$, ..., $Q^K$.

$$SP^{(k)} = \text{reshape}(\text{repmat}(c^k, 1, M^k), 1, Q_{max}), SP^{(k)} \in C^{1 \times Q^{max}} \quad \text{[Equation 5]}$$

Referring to Equation 5 and FIG. 8, "repmat" represents the $c^{k\text{-}th}$ repetition for the $M^{k\text{-}th}$ time at the process 806, and "reshape" represents the above repeated result extended until reaching $Q_{max}$ at the process 807.

Next, a second step of the present invention will hereinafter be described. According to the second step of the present invention, combined impulse responses $b1^{(k)}$, $b2^{(k)}$, ..., $bM^{(k)}$ are created so that all the sub-blocks 805 are convolution-processed with the radio channel impulse response h(k,w) (where $w \in [1, 2, 3, \ldots, W]$). In this case, the convolution-processed results are called $b1^{(k)}$, $b2^{(k)}$, ..., $bM^{(k)}$, respectively.

$$b_j^{(k)}((i-1)*Q_{min}+1:i*Q_{min}+W-1, 2i-1) = SP^{(k)}((i-1)*Q_{min}+1:i*Q_{min}) \otimes h(h,w) \quad \text{[Equation 6]}$$

With reference to Equation 6, k=1, 2, ..., K; i=1, 2, ..., $Q_{max}/Q_{min}$; j=1, 2, ..., M, the symbol '$\otimes$' represents a convolution operation, and individual sub-blocks 805 are contained in $C^{1 \times (Q_{min}+W-1)}$.

A third step of the present invention is illustrated in FIG. 9. According to the third step of the present invention, K number of $b_j(k)$ (i.e., (901 902, and 903), (904, 905, and 906) and (907, 908, and 909)) are grouped into M number of sub-block matrices 910, 911, and 912 (where k=1, 2, ..., K; i=1, 2, ..., $Q_{max}/Q_{min}$; and j=1, 2, ..., M). The number of sub-block matrices 910, 911 and 912 is set to M. All the M sub-block matrices 910, 911, and 912 are arranged to be downshifted by the offset value $Q_{min}$, such that one sub-block matrix V(913) of the joint detection system matrix G having different spreading factors can be created (where $V \in C^{(Q_{max}+W-1) \times K*Q_{max}/Q_{min}}$).

A fourth step of the present invention is illustrated in FIG. 10. According to the fourth step of the present invention, a joint detection system matrix G(1001) having different spreading factors is arranged by downshifting $N[N=N_{max}/(Q_{max}/Q_{min})]$ number of sub-block matrices by a prescribed value $Q_{max}$, respectively, wherein $V \in C^{(Q_{max}+W-1) \times K*Q_{max}/Q_{min}}$. The so-constructed joint detection system matrix G(1001) having different spreading factors is characterized by the sub-block circulant matrix according to the above steps from the first to the fourth steps.

Referring again to FIG. 10, it is obvious that the joint detection system matrix G(1001) is not the block-circulant squared matrix-based sub-block circulant matrix but the block-circulant matrix-based sub-block circulant matrix V(1002). According to a fifth step shown in the above Equation 3 in the present invention, the joint detection system matrix G(1001) having different spreading factors simply creates its own last sub-block row and performs additions of its own sub-block columns until the constructed system matrix G(1001) is converted into a one block-circulant squared matrix such that it can be further extended to a block-circulant squared matrix. The received signal vector corresponding to the system matrix G(1001) is also extended by adding a predetermined value such as '0' to its own end position. If the received signal vector is extended as described above, some cost-efficient algorithms (e.g., a block FFT/DFT-based algorithm) used for calculating a solution of the block-circulant squared matrix may be created. Such a block FFT/DFT-based algorithm will herein be described in detail.

A sixth step of the present invention is illustrated in FIG. 10. According to the sixth step of the present invention, estimated data vectors {d(k,n)}(1006) corresponding to the joint detection having different spreading factors may be created (where k=1, 2, ..., K and n=1, 2, ..., $N_{max}$), and are characterized by the repetition of the estimated data. However, it should be noted that the estimated data vector {d(k,n)}(1006) in FIG. 10 is illustrated in the form of two channelization codes each having the same length as "$Q^2 = 2*Q^1$", and two channelization codes correspond to the estimated data vector 1006 shown in the following Equation 7.

$$\{d(k,n)\} = \{d(1,1), d(2,1), d(1,2), d(2,1), d(1,3), d(2,2), d(1,4), d(2,2), \ldots, d(1, N_{max}), d(2, N_{max})\}^T \quad \text{[Equation 7]}$$

With reference to Equation 7, { }T represents a transpose operation of a data vector.

2. Second Preferred Embodiment

Figure 11:
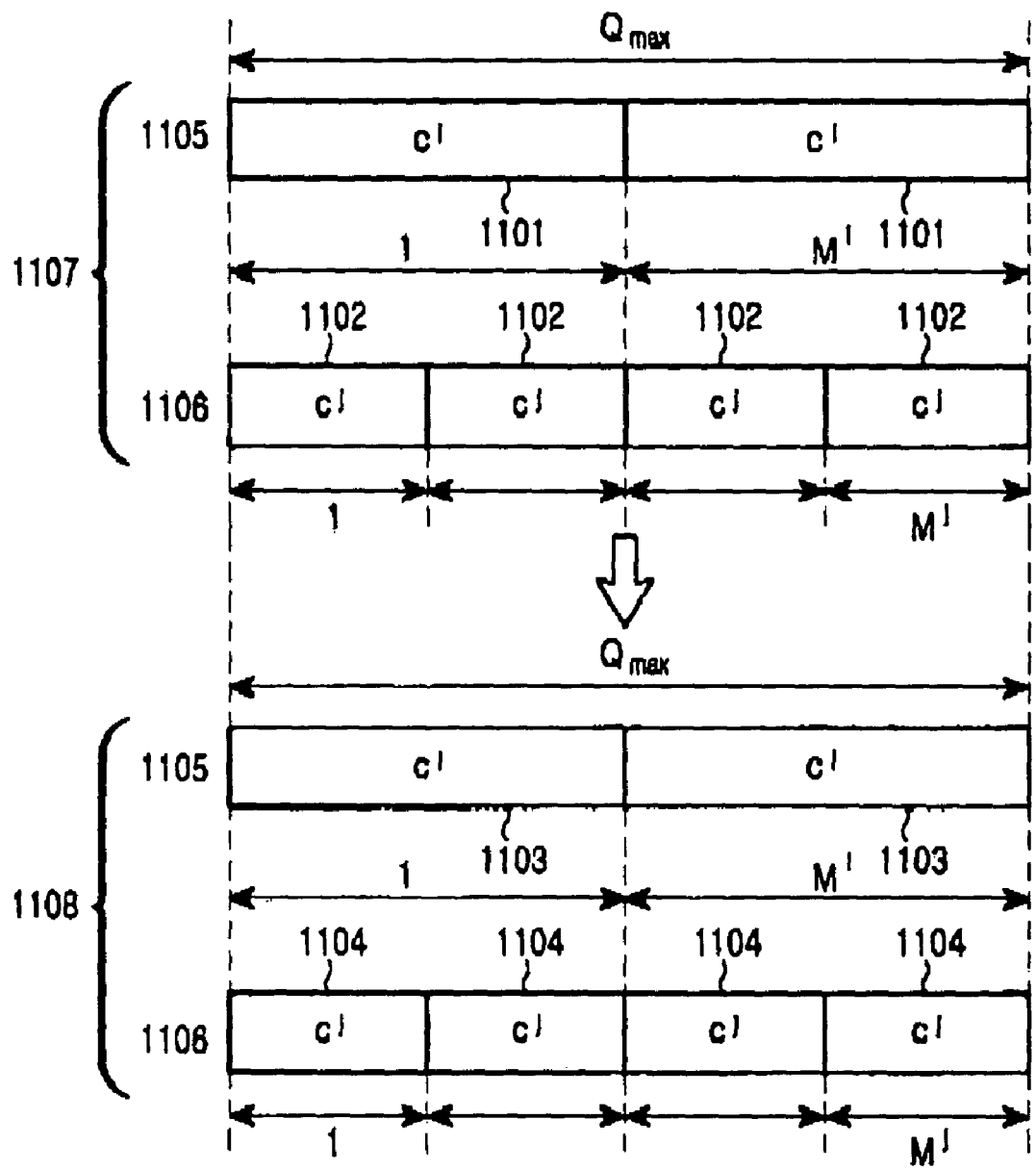
FIG. 11 is a conceptual diagram illustrating repetition and partition of channelization codes with the variable length in accordance with the second preferred embodiment of the present invention.
Figure 12:
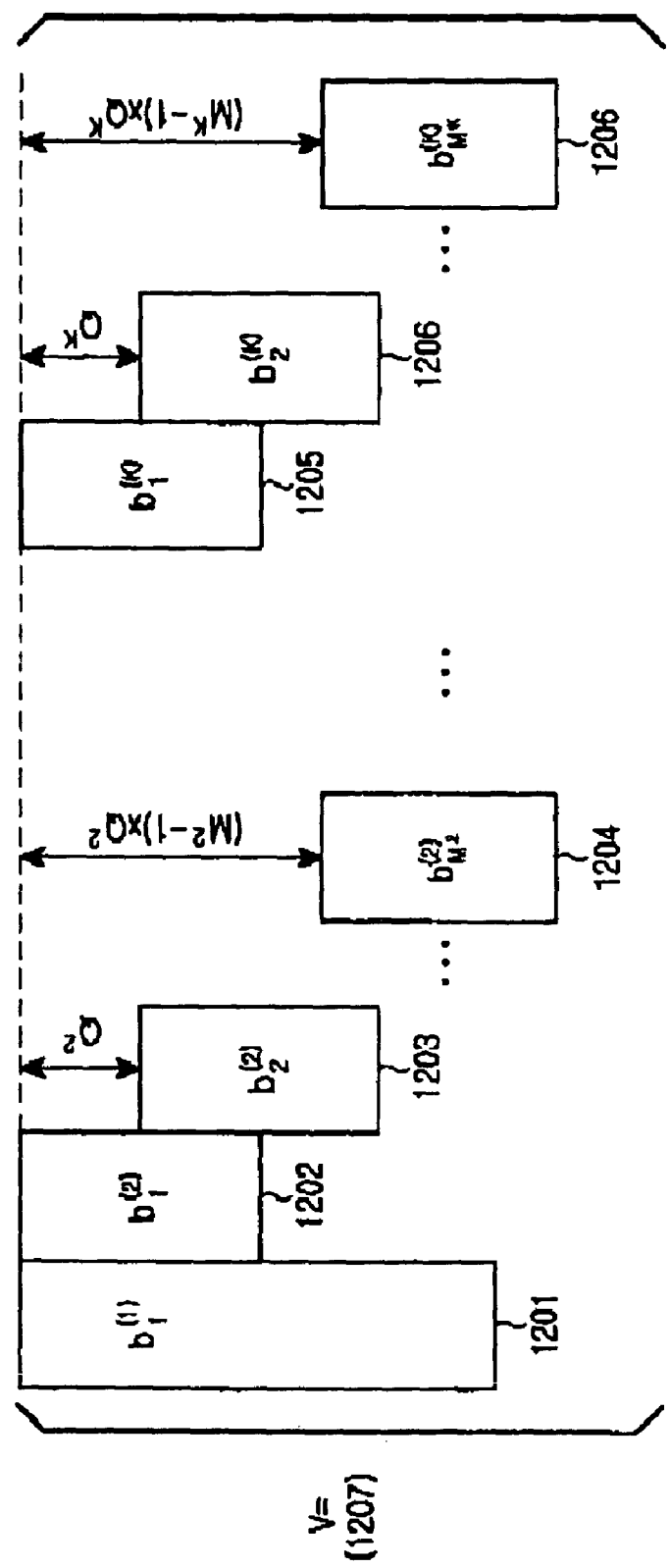
FIG. 12 is a schematic diagram illustrating construction of a system sub-matrix for joint detection with the variable spreading factors in the same time slot in accordance with the second preferred embodiment of the present invention.
Figure 13:
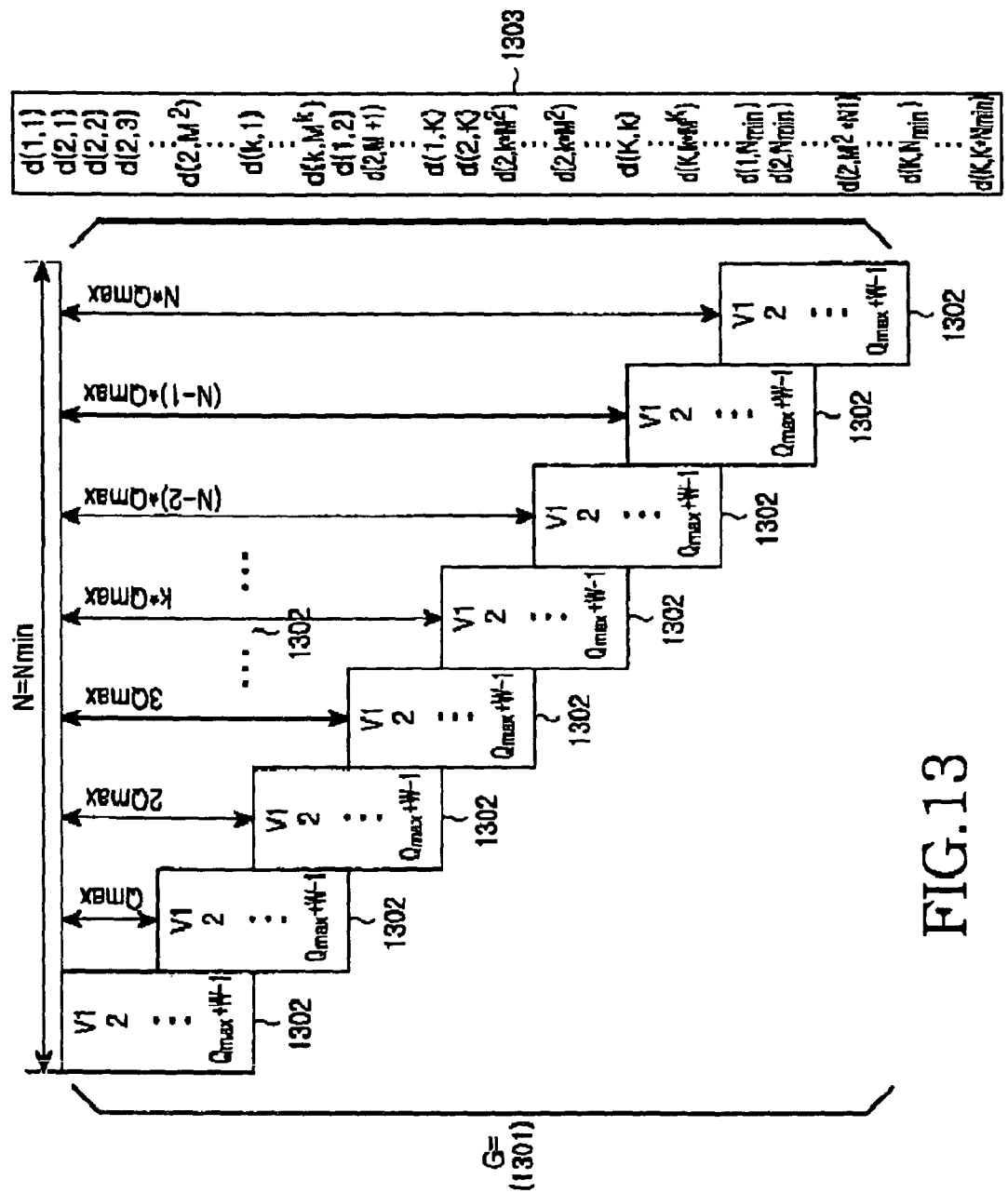
FIG. 13 is a schematic diagram illustrating construction of a system matrix for joint detection with the variable spreading factors in the same time slot in accordance with the second preferred embodiment of the present invention.

Referring to FIGS. 11, 12, and 13, a second method for constructing a system matrix of joint detection receivers having variable spreading factors in the form of a block-circulant matrix will be described in the following second preferred embodiment.

Referring to FIG. 11, according to a first step of the second preferred embodiment in the present invention, all the channelization codes 1101 and 1102 created from different bursts are repeated at a process 1107 until the channelization code blocks 1105 and 1106 each have the same length as a maximum spreading factor $Q_{max}$ or a predetermined value such as "16". The channelization codes 1101 and 1102 created from different bursts having different spreading factors can be constructed in the form of channelization code blocks 1105 and 1106 each having the same length. Thereafter, the repeated channelization code blocks 1105 and 1106 having either the length of $Q_{max}$ or one predetermined value can be further partitioned into several sub-blocks in terms of individual spreading factors $Q^1$, $Q^2$, ..., $Q^K$ at a process 1108. Consequently, all the partitioned sub-blocks 1103 and 1104 created from different bursts having different spreading factors have different lengths $M^1, M^2, \ldots, M^K$, respectively. In this case, $M^k$ is equal to $Q_{max}/Q^k$ (where $k=1,2,\ldots,K$).

$$SP(k)=\text{reshape}(\text{repmat}(c^k,1,M^k),1,Q_{max}), SP^{(k)} \in C^{1 \times Q_{max}} \quad \text{[Equation 8]}$$

With reference to Equation 8, "repmat" represents the $c^{k\text{-}th}$ repetition for the $M^{k\text{-}th}$ time, and "reshape" represents the above repeated result extended until reaching $Q_{max}$.

According to a second step of the second preferred embodiment of the present invention, combined impulse responses $b1^{(k)}, b2^{(k)}, \ldots, bM^{(k)}$ (1107) are created so that all the sub-blocks 1108 or 1109 are convolution-processed with the radio channel impulse response $h(k,w)$ (1110) (where $w \in [1,2,3, \ldots, W]$). In this case, the convolution-processed results are called $b1^{(k)}, b2^{(k)}, \ldots, bM^{(k)}$, respectively.

$$b_j^{(k)}((i-1)*Q^k+1:i*Q^k+W-1, 2i-1) = SP^{(k)}((i-1)*Q^k+1:i*Q^k) \otimes h(k,w) \quad \text{[Equation 8]}$$

With reference to Equation 9, $k=1, 2, \ldots, K$; $i=1, 2, \ldots, Q_{max}/Q^k$; $j=1, 2, \ldots, M^k$; the symbol '$\otimes$' represents a convolution operation, and individual sub-blocks 1103 and 1104 are contained in $C^{1 \times (Q^k + W - 1)}$.

A third step of the second preferred embodiment of the present invention is illustrated in FIG. 12. According to the third step of the second preferred embodiment of the present invention, K number of $b_j(k)$ (i.e., 1201, 1202, 1203, 1204, 1205, and 1206) are grouped into one sub-block matrix (where $k=1,2, \ldots, K$; $i=1, 2, \ldots, Q_{max}/Q^k$; and $j=1, 2, \ldots, Q_{max}/Q^k$). The number of the combined impulse responses 1201 to 1206 is $\Sigma Q_{max}/Q^k$. All the $\Sigma Q_{max}/Q^k$ combined impulse responses are arranged to be downshifted by a prescribed offset value $Q^k$, such that one sub-block matrix V(1207) of the joint detection system matrix having different spreading factors can be created (where $k=1, 2, \ldots, K$).

A fourth step of the second preferred embodiment of the present invention is illustrated in FIG. 13. According to the fourth step of the present invention, a joint detection system matrix G(1301) having different spreading factors is arranged by downshifting $N[N=N_{min}]$ number of sub-block matrices V(1302) by a prescribed value $Q_{max}$ (where $k=1,2, \ldots, K$). The joint detection system matrix G(1301) having different spreading factors is characterized by the sub-block circulant matrix V(1302) according to the above steps from the first to the fourth steps.

Referring again to FIG. 13, it is obvious that the joint detection system matrix G(1301) is not the block-circulant squared matrix-based sub-block circulant matrix V(1302) but the block-circulant matrix-based sub-block circulant matrix V(1302). According to a fifth step shown in the above Equation 3 in the present invention, the joint detection system matrix G(1301) having different spreading factors simply creates its own last sub-block-row and performs additions of its own sub-block columns until the constructed system matrix G(1301) is converted into a one block-circulant squared matrix R, such that it can be further extended to a block-circulant squared matrix R. A received signal vector corresponding to the system matrix G(1301) is also extended by adding a predetermined value such as '0' to its own end position. If the received signal vector is extended as described above, some cost-efficient algorithms (e.g., a block FFT/DFT-based algorithm) used for calculating a solution of the block-circulant squared matrix R may be created. Such a block FFT/DFT-based algorithm will herein be described in detail.

A sixth step of the second preferred embodiment of the present invention is illustrated in FIG. 13. According to the sixth step of the second preferred embodiment of the present invention, estimated data vectors {d(k,n)}(1303) corresponding to the joint detections having different spreading factors may be created (where $k=1, 2, \ldots, K$ and $n=1, 2, \ldots, N_{min}$), and are characterized by an interleaving arrangement of the estimated data. However, it should be noted that the estimated data vector {d(k,n)} (1303) is illustrated in the form of two channelization codes each having the same length as "$Q^2=2*Q^1$", and two channelization codes correspond to the estimated data vector shown in the following Equation 10.

$$\{d(k,n)\}=\{d(1,1), d(1,2), d(2,1), d(1,3), d(1,4), d(2,2), d(1,5), d(1,6), d(2,3) \ldots, d(1,N_{min}), d(2,N_{min})\}^T \quad \text{[Equation 10]}$$

With reference to Equation 10, $\{ \}^T$ represents a transpose operation of a data vector.

3. Alternative Second Preferred Embodiment

Figure 14:
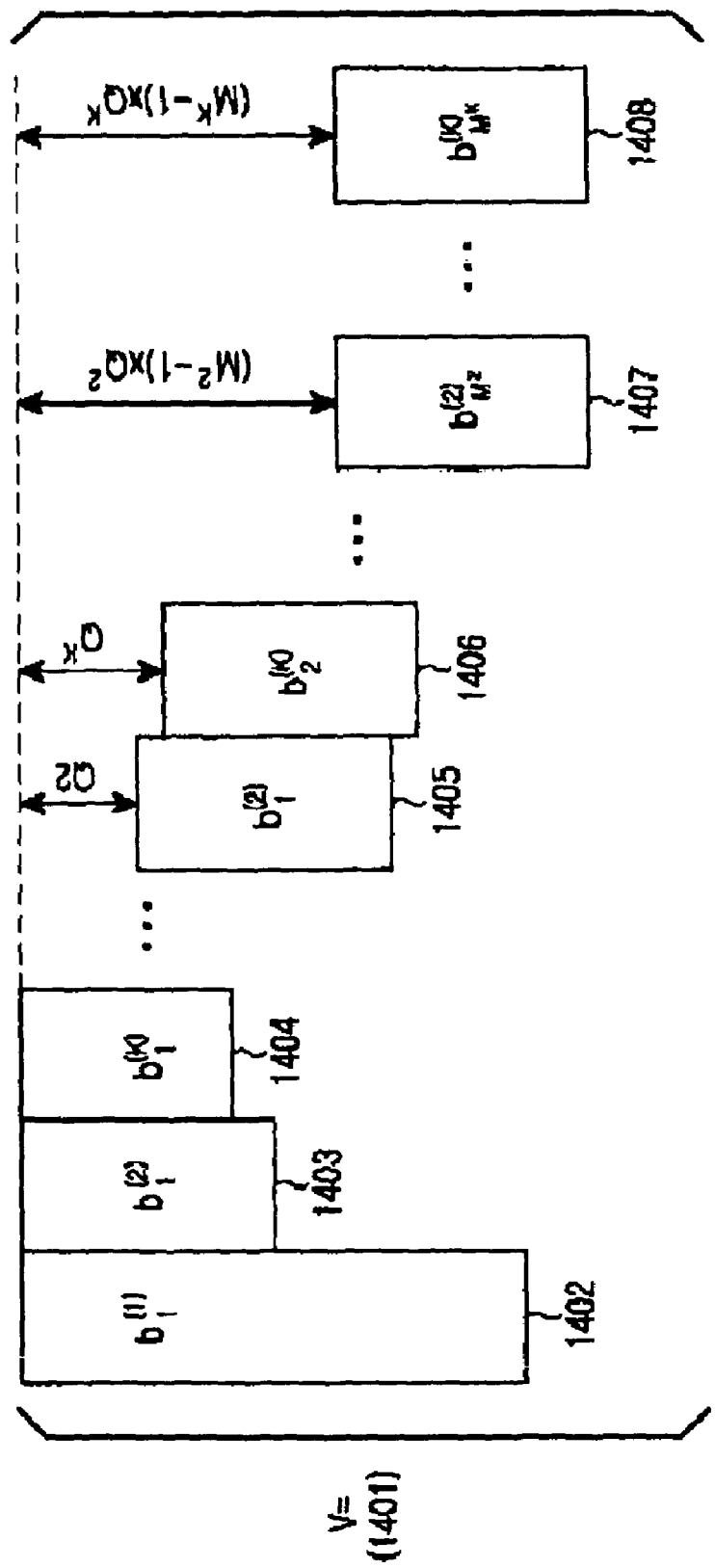
FIG. 14 is a schematic diagram illustrating construction of a system sub-matrix for joint detection in accordance with another example of the second preferred embodiment of the present invention.

An alternative example of the second preferred embodiment of the present invention is illustrated in FIG. 14, such that a system matrix associated with joint detection receivers having variable spreading factors can be constructed in the form of a block-circulant matrix. Positions of individual elements 1402, 1403, 1404, 1405, 1406, 1407, and 1408 are re-partitioned in the sub-matrix V(1401). Data vectors corresponding to the positions are also re-partitioned. However, the remaining steps other than the aforesaid repartition steps are basically the same as those of the aforementioned second preferred embodiment.

It should be noted that the above assumptions are only for the purpose of clarification without limiting the scope of various objectives of the present invention and these description are also applicable to all channelization codes having other spreading factors.

The joint detection system matrix G having different spreading factors in the same time slot has been disclosed in the above description. A method for controlling the joint detection system matrix having variable spreading factors to be constructed by cost-efficient algorithms such as a block FFT/DFT-based algorithm will hereinafter be described.

The circulant matrix should be a squared-format matrix and individual columns or blocks should be configured to be rotated to the left of the circulant matrix, such that the block-circulant FFT/DFT for converting the circulant matrix into a diagonal matrix needs to be described briefly. A system equation is shown in the following Equation 11.

$$Rx=z \qquad \text{[Equation 11]}$$

With reference to Equation 11, R is a block-circulant squared matrix with a predetermined block size of J×L.

However, the block-circulant squared matrix R has a unique characteristic that its eigenvector represents a column or block of the Fourier transform matrix F.

$$R_{(J,L)}=F^{-1}_{(J)}\Lambda_{(J,L)}F_{(L)} \qquad \text{[Equation 12]}$$

With reference to Equation 12, $R_{(J,L)}$ is a block-circulant matrix with a block size of J×L, $F_{(J)}^{-1} \in C^{DJ \times DJ}$ is a block-Fourier inverse transform matrix with a predetermined block size of J×J, and $F(L) \in C^{DJ \times DJ}$ is a block-Fourier transform matrix with a predetermined block size of L×L. The matrix $\Lambda_{(J,L)}$ can be calculated by a block-Fourier transform of a first block column of $C_{(J,L)}$, resulting in the following Equation 13.

$$\text{Diag}_{(J,L)}(\Lambda_{(J,L)})=F_{(J)}R_{(J,L)}(:,1:L) \qquad \text{[Equation 13]}$$

With reference to Equation 13, $R_{(J,L)}(:,1:L)$ indicates the first L columns of $R_{(J,L)}$, such that the Equation 13 can be converted into the following Equation 14.

$$\Lambda_{(J,L)}F_{(L)}x=F_{(J)}z \qquad \text{[Equation 14]}$$

With reference to Equation 14, the least squared (LS) solution for the Equation 14 can be denoted by the following Equation 15.

$$x=F_{(L)}^{-1}(\text{Diag}_{(J,L)}(\Lambda_{(J,L)}))^{(-1)}F_{(L)}z \qquad \text{[Equation 15]}$$

With reference to Equation 15, $(\text{Diag}_{(J,L)}(\Lambda_{(J,L)}))^{(-1)}$ indicates a pseudo-inverse matrix of a corresponding sub-block matrix, and is calculated by a standard matrix pseudo-inverse matrix conversion method or an iterative algorithm.

Alternatively, other optimal or sub-optimal methods, for example, a Zero-Forcing Linear Equalization (ZF-BLE) and a Minimum Mean Squared Error (MMSE), etc., can be adapted to calculate the pseudo-inverse matrix.

A method for adapting the block FFT/DFT scheme to the joint detection system matrix G having different spreading factors in the first preferred embodiment of the present invention will hereinafter be described. It should be noted that the following solution of the first preferred embodiment can also be applicable to the second and third preferred embodiments of the present invention.

Figure 15:
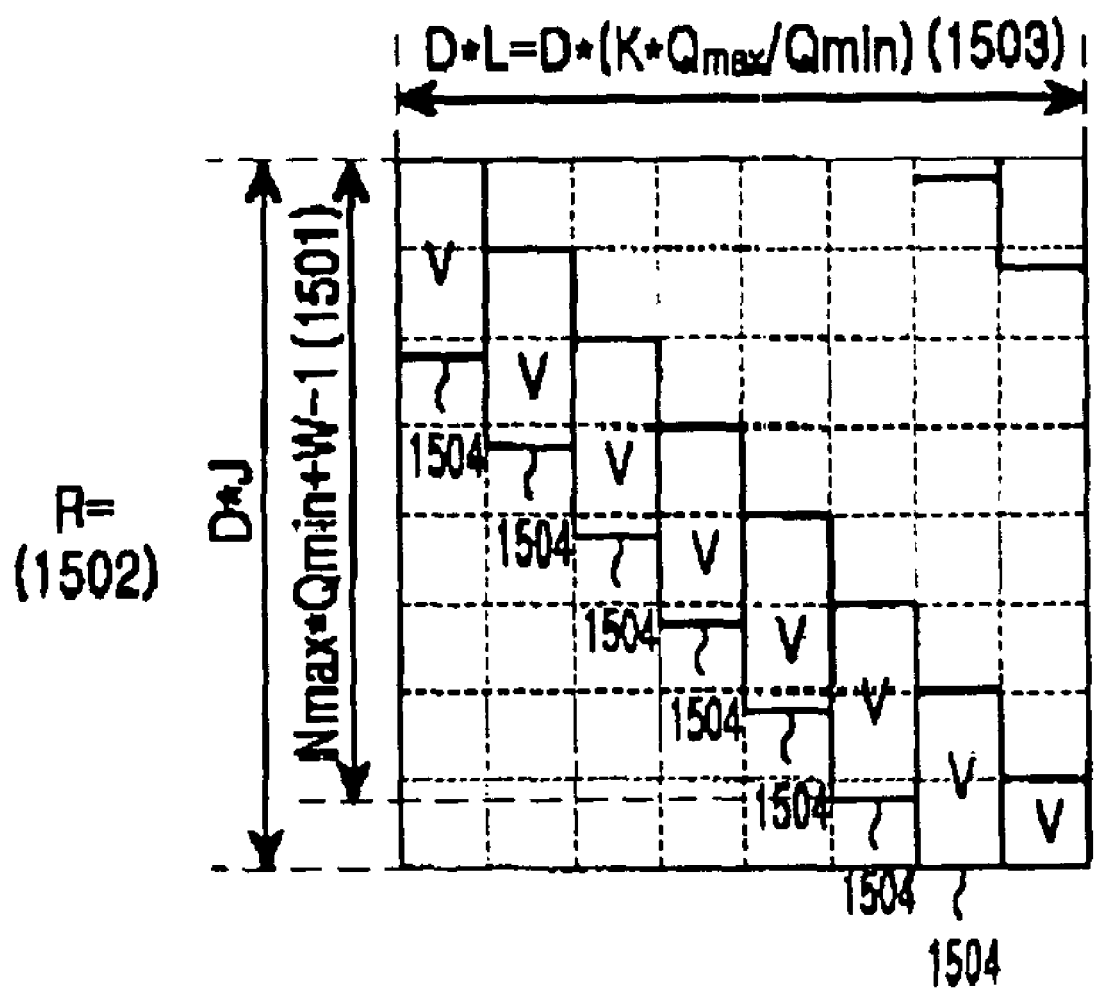
FIG. 15 is a schematic diagram illustrating a block-circulant matrix G extended into a block-circulant squared matrix in accordance with the present invention.

Referring to FIG. 15, the joint detection system matrix having different spreading factors creates its own last sub-block row and performs additions of its own sub-block columns until the constructed system matrix is converted into a one block-circulant spared matrix R(1502) with a predetermined dimension of DJ×DJ, such that the joint detection system matrix can be extended to a block-circulant squared matrix R(1502). In this case, J can be equal to $Q_{max}$, L can be equal to $K^*Q_{max}/Q_{min}$, and D can be denoted by the following Equation 16.

$$D=N_{max}*Q_{min}/Q_{max}+\lfloor(Q_{max}+W-1)/Q_{max}\rfloor-1 \qquad \text{[Equation 16]}$$

With reference to Equation 16, $Q_{min}$ indicates a minimum spreading factor, $N_{max}$ indicates a length of a data vector corresponding to the minimum spreading factor $Q_{min}$, $Q_{max}$ indicates a maximum spreading factor, and W indicates an estimated window length of a radio channel impulse response.

A received signal vector corresponding to the above system matrix is also extended by adding a predetermined value (e.g., '0') to its own end position until reaching its own length of D*J. If the received signal vector is extended as above, the block-circulant matrix is extended to a block-circulant squared matrix R(1502), and a block FFT/DFT-based algorithm for calculating a solution of the block-circulant squared matrix R(1502) is applied to this matrix extension process.

It is assumed that the extended matrix R(1502) of the block-circulant matrix is a block-circulant squared matrix. Based on this fact that the extended matrix R(1502) is a block-circulant squared matrix, the block-circulant squared matrix R(1502) can be converted into a diagonal matrix by means of the block FFT/DFT-based algorithm.

A method for applying the block FFT/DFT-based algorithm to the block-circulant squared matrix R will be described in the following steps 1-4.

At the first step 1, the extended block-column matrix R (:, 1:L)(1502) and the received signal vector are divided into D sub-matrix blocks with the size of J×L and D received signal sub-vectors with the size of J×L, respectively. In this case, J is equal to $Q_{max}$, L is equal to $K^*Q_{max}/Q_{min}$, $Q_{min}$ is a minimum spreading factor, and $Q_{max}$ is a maximum spreading factor.

At the second step 2, if the extended first block-column matrix R(:,1:L) (1502) is divided into the D sub-matrix blocks and the D received signal sub-vectors with the size of J×L, then all the row vectors with the same row numbers are derived from the extended first block-column matrix R(:,1:L) (1502) to create one new sub-block matrix and one new received signal sub-vector. The above new sub-block matrix and one new received signal sub-vector can be FFT- or DFT-transformed, respectively. The above FFT/DFT-transformed results are fed back to original positions within the sub-matrix block and the received signal sub-vector prior to the FFT/DFT transformation. Each sub-matrix of the D sub-matrix blocks with the size J×L indicates one element of eigenvalue matrix $\Lambda$ of the extended matrix R, where $\Lambda=\text{Diag}_{(J,L)}\{\Lambda_1, \Lambda_2, \ldots, \Lambda_k, \ldots, \Lambda_D\}$, each $\Lambda_k$ has a predetermined size of J×L, and k=1, 2, . . . , D. It is well known that the block FFT/DFT transform is a two-dimensional Fourier transform created by a pair of one-dimensional Fourier transforms. More specifically, a predetermined transform process is performed on individual rows, and individual rows are replaced with their substitutions, and the transform process is re-performed on the rows in such a way that the two-dimensional Fourier transform can be performed. The FFT/DFT transform must be applied to all th D blocks of the first block-column matrix R (:, 1:L).

At the third step 3, a matrix inversion is performed on the FFT/DFT-transformed D sub-matrix blocks $\Lambda=\text{Diag}_{(J,L)}\{\Lambda_1, \Lambda_2, \ldots, \Lambda_k, \ldots, \Lambda_D\}$ (where $\Lambda_k$ has a predetermined size of J×L, and k=1, 2, . . . , D). In this case, any standard matrix pseudo-inversion algorithm can be applied to the matrix inversion, the inverse-matrix-formatted D sub-matrix blocks indicate $\Lambda^{-1}=\text{Diag}_{(J,L)}\{\Lambda_1^{-1}, \Lambda_2^{-1}, \ldots, \Lambda_k^{-1}, \ldots, \Lambda_D^{-1}\}$, each $\Lambda_k^{-1}$ is set to a predetermined size of J×L, and k=1, 2, . . . , D). The inverse-matrix-formatted eigenvalues are multiplied by their corresponding received signal sub-vector, such that an inverse FFT/DFT transform or an inverse IFFT/IDFT transform associated with $(\text{Diag}_{(J,L)}(\Lambda_{(J,L)}))^{(-1)}$ $F_{(L)}e$ is performed. Based on the Equation 13, the least squared (LS) solution can be calculated by the above Equation 3.

$$d = F_{(L)}^{-1}(\text{Diag}_{(J,L)}(\Lambda_{(J,L)}))^{(-1)} F_{(L)} e \qquad \text{[Equation 17]}$$

However, the solution vector d(1505) contains the desired results associated with only the first $K*N_{max}$ elements of the estimated vector, and the others, except for the desired results, are considered to be undesired distortion incurred by extending the joint detection system matrix having different spreading factors to a block-circulant squared matrix R(1502), such that they must be removed.

At the fourth step 4, some data elements contained in the first $K*N_{max}$ elements of the estimated vector d are removed because different spreading factors exist in the same time slot. This means that some data elements are repeated. Then, such repetition in the first $K*N_{max}$ elements of the estimated vector is no longer required. Alternatively, the repeated estimation vector may be accumulated in a predetermined location to acquire a reception (Rx) diversity. The final estimation data sequence can be created to perform a joint detection process with different spreading factors.

Figure 16:
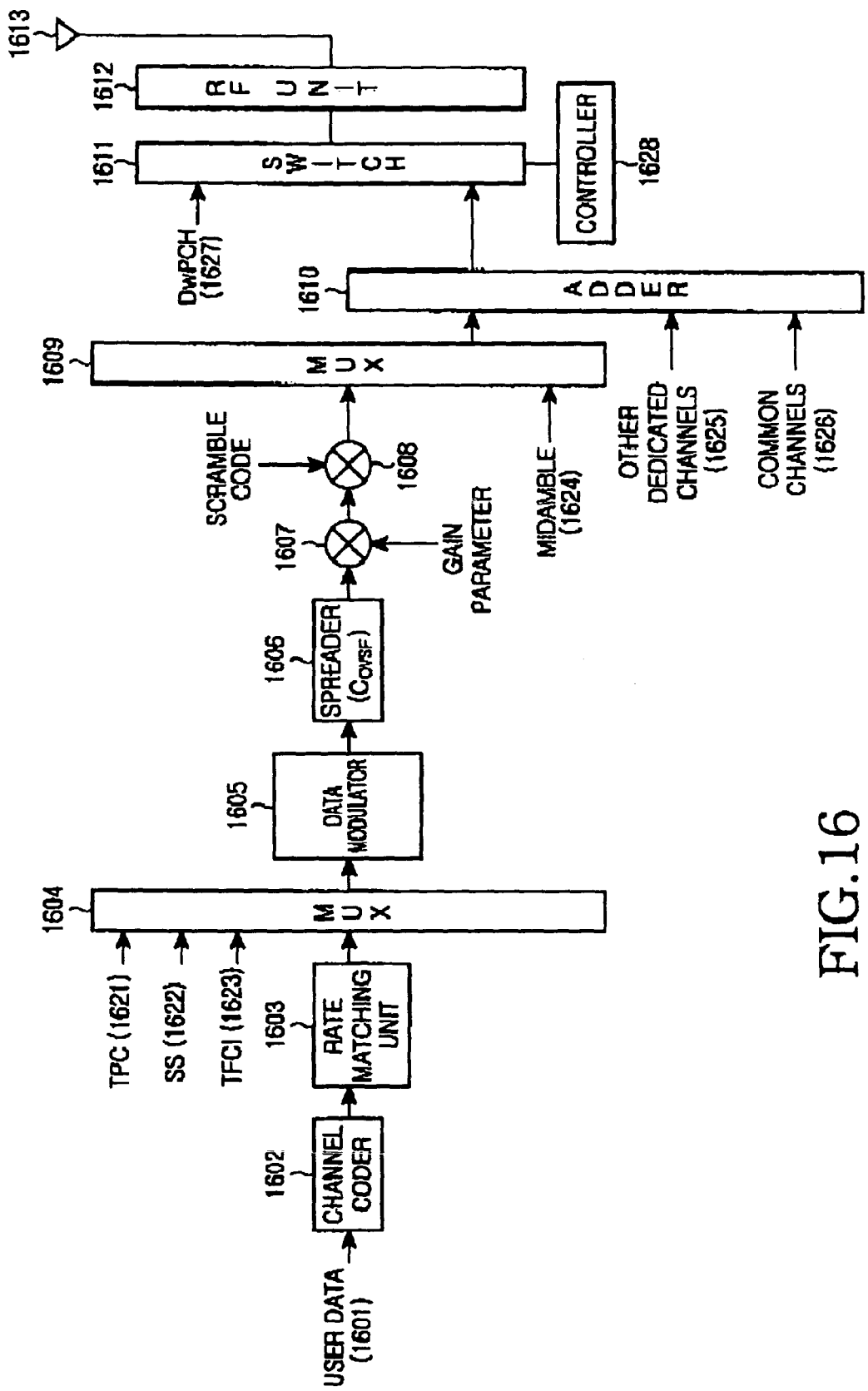
FIG. 16 is a block diagram illustrating a Node-B (i.e., a base station) transmitter in an NB-TDD mobile communication system in accordance with the present invention.
Figure 17:
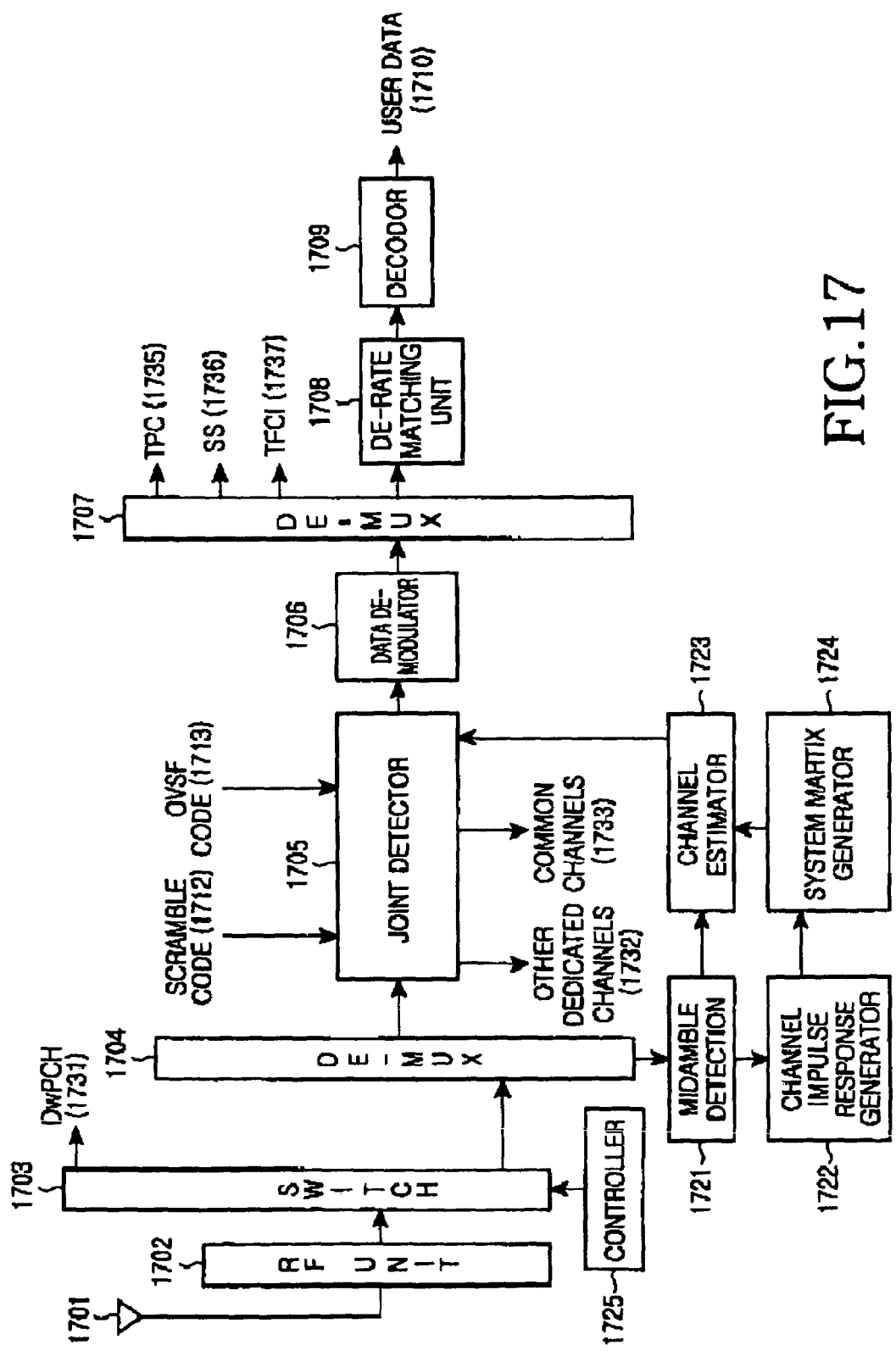
FIG. 17 is a block diagram illustrating a UE receiver in an NB-TDD mobile communication system in accordance with the present invention.
Figure 18:
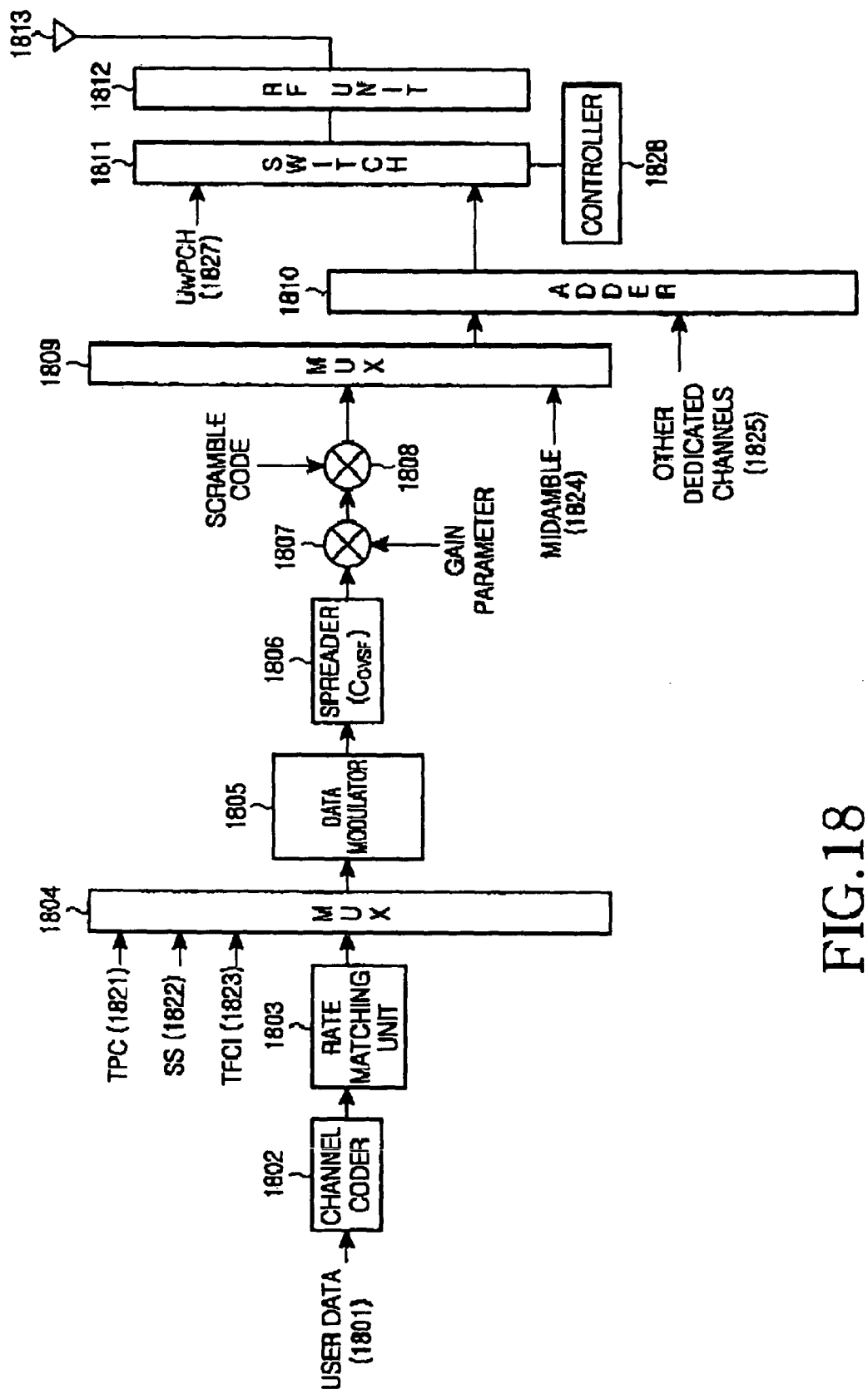
FIG. 18 is a block diagram illustrating a UE transmitter in an NB-TDD mobile communication system in accordance with the present invention.
Figure 19:
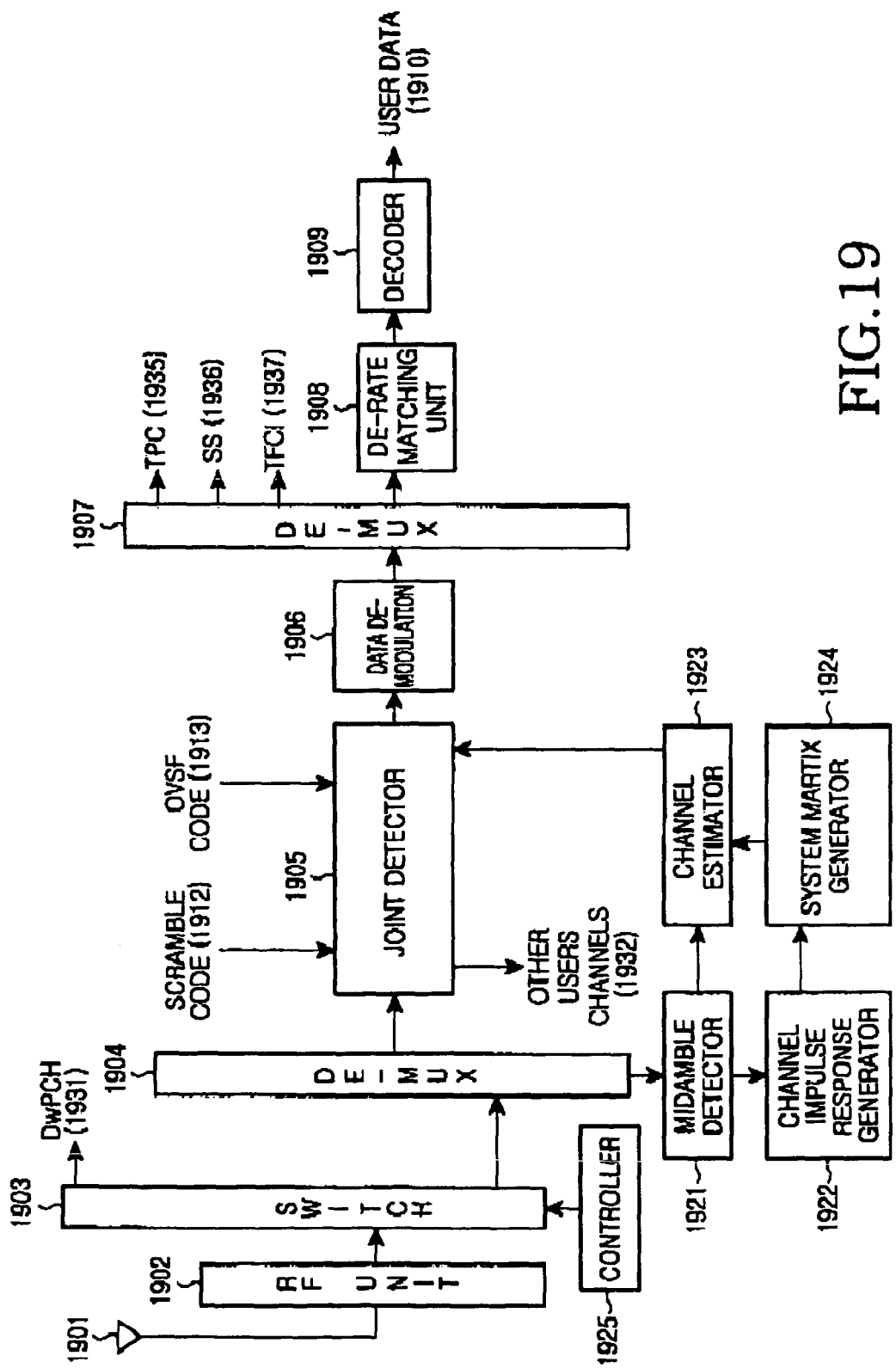
FIG. 19 is a block diagram illustrating a Node-B receiver in an NB-TDD mobile communication system in accordance with the present invention.

FIGS. 16, 17, 18, and 19 are block diagrams illustrating data transmission/reception blocks of a Node B (i.e., a BS) and a UE (i.e., an MS) of the NB-TDD mobile communication system. In more detail, FIG. 16 is a block diagram illustrating a Node-B transmitter of the NB-TDD mobile communication system, FIG. 17 is a block diagram illustrating a UE (User Equipment) receiver having a joint detection receiver associated with the Node B, FIG. 18 is a block diagram illustrating a UE transmitter, and FIG. 19 is a block diagram illustrating a Node-B receiver associated with the UE transmitter.

Referring to FIG. 16, user data 1601 is data to be transferred to a prescribed user, and may be specific information, for example, packet or voice information, and upper layer signaling information. The user data 1601 is encoded at a channel coding process 1602. A convolution-coding method or a turbo-coding method may be applied to this channel encoding process. A rate matching unit 1603 performs a repetition or puncturing process on the result data of the channel coding process 1602, such that the data can be converted into predetermined-format data to be properly transmitted to a physical channel. A multiplexer (MUX) 1604 receives a TPC (Transmit Power Control Command) 1621 used for a UL (UpLink) transmit power control, an SS (Synchronization Shift) command 1622 used for controlling a UL transmit time point, and a TFCI (Transmit Format Combination Indicator) signal 1623, such that bit-unit time slot information is created. In this case, the TFCI 1623 indicates transfer rate information and service category information of a current transmission channel. The output signal of the MUX 1604 is modulated into another signal using a QPSK (Quadrature Phase Shift Keying) or 8PSK (8 Phase Shift Keying) method in the data modulator 1605. The QPSK and 8PSK methods can be dependent on a transfer rate of data to be transmitted. A spreader 1606 multiplies a predetermined channel code by an output signal of the data modulator 1605 in such a way that a spread spectrum process can be performed. A multiplier 1607 multiplies the output signal of the spreader 1606 by a predetermined weight needed to determine a DL TP (DownLink Transmit Power), i.e., a gain parameter, and then the other multiplier 1608 multiplies an output signal of the multiplier 1607 by a prescribed scrambling code. The scrambling code can discriminate signals of Node Bs, and improves a low auto-correlation characteristic of the channel code. The output result of the multiplier 1608 is multiplexed by a midamble element by means of an MUX 1609. An adder 1610 adds a DL (DownLink) dedicated channel signal 1625 transmitted to other signals and a DL common channel signal 1626. In this case, the DL common channel signal 1626 transmits Node B's system information transmitted to all the UEs contained in the Node B and system information of the NB-TDD communication system, such that an output result of the adder 1610 is transmitted to a switch 1611. Because the DL dedicated channel signal 1625 multiplied by its channel code is added to the DL communication channel signal 1626 multiplied by its channel code, the UE receiving the signals according to the channel code characteristic can receive only desired signals. The switch 1611 transmits output signals of the adder 1610 to an RF unit 1612 according to signal transmission time information of output signals of the adder 1610 and a DwPCH 1627, and output signals of the DwPCH 1627 are transferred to the RF unit 1612. A controller 1628 is adapted to adjust the transmission time points. Signals converted into carrier-band signals by the RF unit 1612 are transmitted via an antenna 1613.

FIG. 17 is a block diagram illustrating a UE receiver corresponding to the Node B transmitter illustrated in FIG. 16, and depicts an example of the joint detection receiver according to the present invention. Referring to FIG. 17, a signal received via an antenna 1701 is applied to an RF unit 1702 such that it is converted into a baseband signal, and then the baseband signal is transmitted to a switch 1703. Upon receiving a control signal from a controller 1725, the switch 1703 outputs a DwPCH 1731 at a UpPCH reception time, or outputs a prescribed signal to a demultiplexer (DEMUX) 1704 at a reception time of a DL dedicated channel signal or a DL common channel.

The DEMUX 1704 selects only midamble information from among its received signal, and transmits the selected midamble information to a midamble detector 1721. The midamble detector 1721 detects all the received midambles using the received midamble information, and the detected midambles are applied to a channel impulse response generator 1722 and a channel estimator 1723. The channel impulse response generator 1722 generates channel impulse responses associated with all the radio channels through which all the received midambles are transferred. The generated channel impulse responses are transmitted to a system matrix generator 1724, such that they are adapted to generate the system matrix. The system matrix generator 1724 generates the system matrix according to the above method of the present invention. A representative exemplary method of the present invention has been disclosed in the above description.

The system matrix is transmitted to the channel estimator 1723. The channel estimator 1723 transmits the midamble information generated from the midamble detector 1721 and the system matrix to the joint detector 1705. The joint detector 1705 receives an output signal of the DEMUX 1704 (i.e., an output signal of a data portion), the system matrix generated from the channel estimator 1723, scrambling code information 1712, and channel code information 1713, performs channel compensation for only the signal transmitted to the UE, and outputs the channel-compensated result to the data demodulator 1706. The other dedicated channel signal 1732 indicates another DL dedicated channel signal needed for the UE. The DL channel information and the signal transferred to the data demodulator 1706 are channel-encoded by different channel codes, respectively. The DL common channel 1733 is a channel for transmitting either Node-B system information or NB-TDD communication system information needed for the UE. The UE can interpret or analyze information transmitted to the channels on the condition that the DL dedicated channels 1732 and the DL common channels 1733 are to be applied to the data demodulator 1706.

The data demodulator 1706 demodulates its entry signals using a demodulation scheme associated with the modulation technique shown in FIG. 16. The demodulation scheme may be a QPSK demodulation or an 8PSK demodulation scheme. The output signals of the data demodulator 1706 are applied to the DEMUX 1707, and are divided into a TPC 1735, an SS 1736, a TFCI 1737, and data, respectively. The TPC 1735 is adapted to determine a power level of a UL channel signal to be transmitted to the Node B by the UE, the SS 1736 is adapted to control a UL transmission time of the UE. The TFCI 1737 is adapted to analyze or interpret a reception signal of the UE.

Output data of the DEMUX 1707 is applied to a de-rate matching unit 1708, such that repeated bits are added to each other, the punctured bits indicate their puncturing positions, and are applied to the decoder 1709. The decoder 1709 may be a Viterbi decoder for convolution codes or a turbo-decoder for turbo codes. Using the convolution codes or the turbo codes is dependent on a transfer rate of data to be transmitted. The output signal 1710 of the decoder 1709, i.e., a voice or audio signal, a packet signal, or upper layer signaling information, can be adapted to be appropriate for a variety of use purposes.

FIG. 18 is a block diagram illustrating a UE transmitter. Referring to FIG. 18, user data 1801 is data to be transmitted to the Node B, and may correspond to packet information, voice information, or upper layer signaling information. The user data 1801 is encoded by the channel coder 1802. The channel coding method may be a convolution coding method or a turbo coding method. Output data of the channel coder 1802 is repeated or punctured by a rate matching unit 1803, and is thereby converted into a prescribed data format capable of being properly transmitted to a physical channel.

A multiplexer (MUX) 1804 receives a TPC (Transmit Power Control Command) 1821 used for a DL (DownLink) transmit power control, an SS (Synchronization Shift) command 1822 used for controlling a DL transmit time point, and a TFCI signal 1823, such that bit-unit time slot information is created. In this case, the TFCI is adapted to indicate transfer rate information and service category information of a current transmission channel. The output signal of the MUX 1804 is modulated into another signal using a QPSK or 8PSK (8 Phase Shift Keying) method in the data modulator 1805. The QPSK and 8PSK methods can be dependent on a transfer rate of data to be transmitted. A spreader 1806 multiplies a predetermined channel code by an output signal of the data modulator 1805 in such a way that a spread spectrum process can be performed.

A multiplier 1807 multiplies the output signal of the spreader 1806 by a predetermined weight needed to determine a DL TP (DownLink Transmit Power), and then the other multiplier 1808 multiplies an output signal of the multiplier 1807 by a prescribed scrambling code. The scrambling code is adapted to discriminate signals from within Node B and improve a low auto-correlation characteristic of the channel code. A maximum number of the physical channels available for one UE in UL transmission is equal to 2, a length of a channel code to be used for the physical channels, i.e., a length of OVSFs needs a predetermined condition that the sum of inverse numbers of the OVSF lengths is the same or lower than a predetermined value '1'.

Therefore, the inventive method can be more effectively used for a Node B receiving the UL transmission signal.

The output signal of the multiplier 1808 is multiplexed with midamble information 1824 at the MUX 1809. An adder 1810 adds the multiplexed signal generated from the multiplier 1808 and a UL dedicated channel signal 1825, and the added result is applied to the switch 1811. A switch 1811 transmits the output signals of the adder 1810 to an RF unit 1812 according to a transmission time of the 1810's output signals and a transmission time of an UpPCH used for a call setup operation of a Node B 1827, and transmits the UpPCH 1827 to the RF unit 1812. The controller 1828 adjusts the above transmission times. Signals converted into carrier-band signals by the RF unit 1812 are transmitted over the antenna 1813.

FIG. 19 is a block diagram illustrating a Node-B receiver associated with the UE transmitter, and is an example of the joint detection receiver according to the present invention. Referring to FIG. 19, a signal received via an antenna 1901 is applied to an RF unit 1902, converted into a baseband signal, and then the baseband signal is transmitted to a switch 1903. Upon receiving a control signal from a controller 1925, the switch 1903 outputs a DwPCH 1931 at a UpPCH reception time, or outputs a prescribed signal to a demultiplexer (DEMUX) 1904 at a reception time of a UL channel. The DEMUX 1904 selects only midamble information from among its received signal, and transmits the selected midamble information to a midamble detector 1921 The midamble detector 1921 detects all the received midambles using the received midamble information, and the detected midambles are applied to a channel impulse response generator 1922 and a channel estimator 1923. The channel impulse response generator 1922 generates channel impulse responses associated with all the radio channels through which all the received midambles are transferred. The generated channel impulse responses are transmitted to a system matrix generator 1924, such that they are adapted to generate the system matrix. The system matrix generator 1924 generates the system matrix according to the above method of the present invention. A representative exemplary method of the present invention has been disclosed in the above description.

The system matrix is transmitted to the channel estimator 1923. The channel estimator 1923 transmits the midamble information generated from the midamble detector 1921 and the system matrix to the joint detector 1905. The joint detector 1905 receives an output signal of the DEMUX 1904 (i.e., an output signal of a data portion), the system matrix generated from the channel estimator 1923, scrambling code information 1912, and channel code information 1913, compensates for only a channel signal consistent with the channel code information 1913, and outputs the channel-compensated result to the data demodulator 1906. Another channel 1932 is another UE's signal transmitted to the Node B. This other UE's signal is also applied to the data demodulator 1906, passes through signal processes after the data demodulation process of the data demodulator 1906, is analyzed or interpreted to be adapted for a necessary use. Operations of the Node B after the data demodulation process 1906 will hereinafter be described.

The data demodulator 1906 demodulates its entry signals using a demodulation scheme associated with the modulation technique illustrated in FIG. 18. The demodulation scheme may be a QPSK demodulation or an 8PSK demodulation scheme. The output signals of the data demodulator 1906 are applied to the DEMUX 1907, and are divided into a TPC 1935, an SS 1936, a TFCI 1937, and data, respectively. The TPC 1935 is adapted to determine a power level of a UL channel signal to be transmitted to the Node B by the ULE, the SS 1936 is adapted to control a UL transmission time of the UE. The TFCI 1937 is adapted to analyze or interpret a reception signal of the UE.

Output data of the DEMUX 1907 is applied to a de-rate matching unit 1908, such that repeated bits are added to each other, the punctured bits indicate their puncturing positions, and are applied to the decoder 1909. The decoder 1909 may be a Viterbi decoder for convolution codes or a turbo-decoder for turbo codes. Whether the convolution codes or the turbo codes are used is dependent on a transfer rate of data to be transmitted. The output signal 1910 of the decoder 1909, i.e., a voice or audio signal, a packet signal, or upper layer signaling information, can be adapted to be appropriate for a variety of use purposes.

As apparent from the above description, a joint detection receiver and its control method according to the present invention construct a joint detection system matrix using OVSFs in the same time slot in the form of a block-circulant matrix, such that FFT/DFT operations can be applicable to the present invention, resulting in significant-lower complexity of the joint detection receiver system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A joint detection reception method, which is utilized irrespective of a length of an orthogonal code in a TD (Time Division)—CDMA (Code Division Multiple Access) communication system, to create a system matrix associated with a joint detection receiver in a same time slot of the TD-CDMA mobile communication system, the method comprising the steps of:
   a) performing repetition of all channelization codes created from different bursts until a length of individual channelization code blocks is equal to one of a maximum spreading factor and a predetermined value, and creating channelization code blocks having the same lengths;
   b) partitioning the channelization code blocks having same lengths into at least one sub-block in order to create channelization code blocks constructed in terms of minimum spreading factors of individual spreading factor sets;
   c) performing a convolution operation between at least one partitioned sub-block and a radio channel impulse response, and creating combined impulse responses;
   d) grouping the combined impulse responses into combined impulse response sub-block matrices, arranging the combined impulse response sub-block matrices each to be downshifted by an integer times a predetermined offset value, and constructing joint detection sub-block matrices; and
   e) arranging individual joint detection sub-block matrices to be downshifted by an integer times the maximum spreading factor, and constructing a joint detection system matrix.

2. The method as set forth in claim 1, wherein the time slot comprises at least one area selected from a plurality of areas, a midamble area, and a GP (Guard Period) area located between prescribed time slots contained in an allocated wireless frame.

3. The method as set forth in claim 1, further comprising the step of:
   f) performing addition of sub-block columns of the system matrix until the joint detection system matrix is converted into a one block-circulant squared matrix.

4. The method as set forth in claim 3, further comprising the step of:
   g) adding a predetermined value to a lower end position of a received signal vector corresponding to the block circulant squared matrix in order to provide a predetermined length equal to that of a column of the block-circulant squared matrix.

5. The method as set forth in claim 3, further comprising the step of:
   h) applying a block FFT/DFT (Fast Fourier Transform/ Discrete Fourier Transform) algorithm to the block-circulant squared matrix to acquire a solution of the block-circulant squared matrix.

6. The method as set forth in claim 3, further comprising the step of:
   i) creating an estimated data vector associated with a joint detection element having different spreading factors by performing repetition of predetermined estimation data.

7. A joint detection reception method, which is utilized irrespective of a length of an orthogonal code in a TD (Time Division)—CDMA (Code Division Multiple Access) communication system, to create a system matrix associated with a joint detection receiver in a same time slot of the TD-CDMA mobile communication system, the method comprising the steps of:
   a) performing repetition of all channelization codes created from different bursts until a length of individual channelization code blocks is equal to one of a maximum spreading factor and a predetermined value, and creating channelization code blocks having the same lengths;
   b) partitioning the channelization code blocks having same lengths into at least one sub-block in order to create channelization code blocks constructed in terms of individual spreading factor sets;
   c) performing a convolution operation between at least one partitioned sub-block and a radio channel impulse response, and creating combined impulse responses;
   d) grouping the combined impulse responses into one sub-block matrix, arranging at least one combined impulse response creating the sub-block matrix to be downshifted by an integer times a predetermined offset value, and constructing a sub-block matrix of a joint detection system matrix; and
   e) arranging the sub-block matrices to be downshifted by an integer times a predetermined factor, and constructing a joint detection system matrix.

8. The method as set forth in claim 7, wherein the time slot comprises at least one area selected from a plurality of areas, a midamble area, and a GP (Guard Period) area located between prescribed time slots contained in an allocated wireless frame.

9. The method as set forth in claim 7, further comprising the step of:
   f) performing addition of sub-block columns of the joint detection system matrix until the joint detection system matrix is converted into a one block-circulant squared matrix.

10. The method as set forth in claim 9, further comprising the step of:

g) adding a predetermined value to a lower end position of a received signal vector corresponding to the block-circulant squared matrix in order to provide a predetermined length equal to that of a column of the block-circulant squared matrix.

11. The method as set forth in claim 9, further comprising the step of:
   h) applying a block FFT/DFT (Fast Fourier Transform/Discrete Fourier Transform) algorithm to the block-circulant squared matrix to acquire a solution of the block-circulant squared matrix.

12. The method as set forth in claim 9, further comprising the step of:
   i) creating an estimated data vector associated with a joint detection element having different spreading factors by performing repetition of predetermined estimation data.

13. The method as set forth in claim 7, further comprising the steps of:
   j) grouping the combined impulse responses into a sub-block matrix, arranging a number of grouped impulse responses to be downshifted by an integer times a predetermined offset valuein ascending numerical order of a specific variable, and constructing a sub-block matrix of a joint detection system matrix; and
   k) arranging the sub-block matrices to be downshifted by an integer times a predetermined factor, and constructing a joint detection system matrix 14. The method as set forth in claim 13, further comprising the step of:
   l) after creating the joint detection system matrix, performing addition of sub-block columns of the system matrix until the system matrix is converted into a one block-circulant squared matrix.

15. The method as set forth in claim 13, further comprising the step of:
   m) adding a predetermined value to a lower end position of a received signal vector corresponding to the matrix in order to provide a predetermined length equal to that of a column of the block-circulant squared matrix.

16. The method as set forth in claim 13, further comprising the step of:
   n) applying a block FFT/DFT (Fast Fourier Transform/Discrete Fourier Transform) algorithm to the block-circulant squared matrix to acquire a solution of the block-circulant squared matrix.

17. The method as set forth in claim 13, further comprising the step of:
   o) creating an estimated data vector associated with a joint detection element having different spreading factors by performing repetition of predetermined estimation data.

18. A joint detection reception apparatus, which is utilized irrespective of a length of an orthogonal code in a TD (Time Division)—CDMA (Code Division Multiple Access) communication system, for creating a system matrix associated with a joint detection receiver in a same time slot of the TD-CDMA mobile communication system, comprising:
   a channelization code generator for generating OVSFs (Orthogonal Variable Spreading factors);
   a channel estimator for detecting midamble information from the received one time slot, and generating a channel impulse response using the detected midamble information; and
   a joint detection unit for a) performing repetition of all channelization codes created from different bursts until a length of individual channelization code blocks is equal to a maximum spreading factor $Q_{max}$ or a predetermined value, and creating channelization code blocks having the same lengths; b) partitioning the channelization code blocks having the same lengths into at least one sub-block in order to create the channelization code blocks constructed in terms of minimum spreading factors of individual spreading factor sets; c) performing a convolution operation between at least one partitioned sub-block and a radio channel impulse response, and creating combined impulse responses; d) grouping the combined impulse responses into combined impulse response sub-block matrices, arranging the combined impulse response sub-block matrices each to be downshifted by an integer times a predetermined offset value, and constructing joint detection sub-block matrices; e) arranging the M sub-block matrices to be downshifted by an integer times a predetermined offset value, and constructing a sub-block matrix ofajoint detection system matrix; and
   f) arranging the sub-block matrices to be downshifted by an integer times a predetermined value, and constructing a joint detection system matrix.

19. The apparatus as set forth in claim 18, wherein the time slot comprises at least one area selected from a plurality of areas, a midamble area, and a GP (Guard Period) area located between prescribed time slots contained in an allocated wireless frame.

20. The apparatus as set forth in claim 18, wherein the joint detection unit, after creating the joint detection system matrix, adds sub-block columns of the system matrix until the system matrix is converted into a one block-circulant squared matrix.

21. The apparatus as set forth in claim 18, wherein the joint detection unit, after creating the block-circulant squared matrix, adds a predetermined value to a lower end position of a received signal vector corresponding to the matrix in order to provide a predetermined length equal to that of a column of the block-circulant squared matrix.

22. The apparatus as set forth in claim 18, wherein the joint detection unit applies a block FFTIDFT (Fast Fourier Transform/Discrete Fourier Transform) algorithm to the block-circulant squared matrix to acquire a solution of the block-circulant squared matrix.

23. The apparatus as set forth in claim 18, wherein the joint detection unit creates an estimated data vector associated with a joint detection element having different spreading factors by performing repetition of predetermined estimation data.

24. A joint detection reception apparatus, which is utilized irrespective of a length of an orthogonal code in a TD (Time Division)—CDMA (Code Division Multiple Access) communication system, for creating a system matrix associated with a joint detection receiver in a same time slot of the TD-CDMA mobile communication system, comprising:
   a channelization code generator for generating OVSFs (Orthogonal Variable Spreading factors);
   a channel estimator for detecting midamble information from the received one time slot, and generating a channel impulse response using the detected midamble information; and
   a joint detection unit for a) performing repetition of all channelization codes created from different bursts until a length of individual channelization code blocks is equal to one of a maximum spreading factor and a predetermined value, and creating channelization code blocks having the same lengths; b) partitioning the channelization code blocks having the same lengths into at least one sub-block in order to create the channelization code blocks constructed in terms of individual spreading factor sets; c) performing a convolution operation between at least one partitioned sub-block and a radio channel impulse response, and creating combined impulse responses; d) grouping the combined impulse responses into one sub-block matrix, arranging a number of grouped impulse responses to be downshifted by an integer times a predetermined offset value, and constructing a sub-block matrix of a joint detection system matrix; and e) arranging the sub-block matrices to be downshifted by an integer times a predetermined factor, and constructing a joint detection system matrix.

25. The apparatus as set forth in claim 24, wherein the time slot comprises at least one area selected from a plurality of areas, a midamble area, and a GP (Guard Period) area located between prescribed time slots contained in an allocated wireless frame.

26. The apparatus as set forth in claim 24, wherein the joint detection unit, after creates the joint detection system matrix, performing addition of sub-block columns of the joint detection system matrix until the joint detection system matrix is converted into a one block-circulant squared matrix.

27. The apparatus as set forth in claim 26, wherein the joint detection unit, after creating the block-circulant squared matrix, adds a predetermined value to a lower end position of a received signal vector corresponding to the matrix in order to provide a predetermined length equal to that of a column of the block-circulant squared matrix.

28. The apparatus as set forth in claim 26, wherein the joint detection unit applies a block FFT/DFT (Fast Fourier Transform/Discrete Fourier Transform) algorithm to the block-circulant squared matrix to acquire a solution of the block-circulant squared matrix.

29. The apparatus as set forth in claim 26, wherein the joint detection unit creates an estimated data vector associated with a joint detection element having different spreading factors by performing repetition of predetermined estimation data.

30. The apparatus as set forth in claim 24, wherein the joint detection unit, after creating combined impulse responses, groups the combined impulse responses into one sub-block matrix, arranges a number of grouped impulse responses to be downshifted by an integer times a predetermined offset value in ascending numerical order of a specific variable, and constructing a sub-block matrix of a joint detection system matrix; and arranges the sub-block matrices to be downshifted by an integer times a predetermined factor, and constructs a joint detection system matrix.

31. The apparatus as set forth in claim 30, wherein the joint detection unit, after creating the joint detection system matrix, adds sub-block columns of the system matrix until the system matrix is converted into a one block-circulant squared matrix.

32. The apparatus as set forth in claim 31, wherein the joint detection unit, after creating the block-circulant squared matrix, adds a predetermined value to a lower end position of a received signal vector corresponding to the matrix in order to provide a predetermined length equal to that of a column of the block-circulant squared matrix.

33. The apparatus as set forth in claim 31, wherein the joint detection unit applies a block FFT/DFT (Fast Fourier Transform/Discrete Fourier Transform) algorithm to the block-circulant squared matrix to acquire a solution of the block-circulant squared matrix.

34. The apparatus as set forth in claim 31, wherein the joint detection unit creates an estimated data vector associated with a joint detection element having different spreading factors by performing repetition of predetermined estimation data.

* * * * *